US007048235B2

(12) United States Patent
McLean et al.

(10) Patent No.: US 7,048,235 B2
(45) Date of Patent: *May 23, 2006

(54) SLOTTED AIRCRAFT WING

(75) Inventors: James D. McLean, Seattle, WA (US); David P. Witkowski, Des Moines, WA (US); Richard L. Campbell, Newport News, VA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/678,397

(22) Filed: Oct. 3, 2003

(65) Prior Publication Data
US 2005/0017126 A1   Jan. 27, 2005

Related U.S. Application Data

(60) Provisional application No. 60/417,355, filed on Oct. 9, 2002.

(51) Int. Cl.
*B64C 3/50* (2006.01)

(52) U.S. Cl. ........................ 244/215; 244/216; 244/204

(58) Field of Classification Search ................ 244/215, 244/216, 130, 123, 198, 199, 204, 213
See application file for complete search history.

(56) References Cited

U.S. PATENT DOCUMENTS

| 2,177,798 A | | 10/1939 | Bechereau |
| 2,772,058 A | * | 11/1956 | Grant ........................... 244/216 |
| 2,908,454 A | | 10/1959 | De Wolff |
| 3,259,341 A | * | 7/1966 | Steidl ........................... 244/207 |
| 3,638,886 A | * | 2/1972 | Zimmer ........................ 244/210 |
| 3,653,611 A | | 4/1972 | Trupp et al. |
| 4,015,787 A | | 4/1977 | Maieli et al. |
| 4,117,996 A | | 10/1978 | Sherman |
| 4,353,517 A | | 10/1982 | Rudolph |
| 4,441,675 A | | 4/1984 | Boehringer et al. |
| 4,498,646 A | | 2/1985 | Proksch et al. |
| 4,533,096 A | | 8/1985 | Baker et al. |
| 4,575,030 A | | 3/1986 | Gratzer |
| 4,576,347 A | | 3/1986 | Opsahl |
| 4,856,735 A | * | 8/1989 | Lotz et al. ................. 244/35 R |
| 5,082,208 A | | 1/1992 | Matich |
| 5,088,661 A | | 2/1992 | Whitener |
| 5,178,348 A | | 1/1993 | Bliesner |

(Continued)

FOREIGN PATENT DOCUMENTS

EP   0 838 394   4/1998

OTHER PUBLICATIONS

Application of Mini-Trailing-Edge Devices in the Awiator Project, H. Hansen, Airbus Deutschland, EGAG, Hunefeldstr. 1-5, D-28199 Bremen, Germany.

(Continued)

*Primary Examiner*—J. Woodrow Eldred
(74) *Attorney, Agent, or Firm*—Harness Dickey & Pierce P.L.C.

(57) ABSTRACT

A swept aircraft wing includes a leading airfoil element and a trailing airfoil element. At least one full-span slot is defined by the wing during at least one transonic condition of the wing. The full-span slot allows a portion of the air flowing along the lower surface of the leading airfoil element to split and flow over the upper surface of the trailing airfoil element so as to achieve a performance improvement in the transonic condition.

38 Claims, 18 Drawing Sheets

U.S. PATENT DOCUMENTS

| | | |
|---|---|---|
| 5,265,830 A | 11/1993 | Allen |
| 5,551,651 A * | 9/1996 | Hendrickson ............... 244/215 |
| 5,680,124 A | 10/1997 | Bedell et al. |
| 5,686,907 A | 11/1997 | Bedell et al. |
| 5,788,190 A | 8/1998 | Siers |
| 6,293,497 B1 | 9/2001 | Kelley-Wickemeyer et al. |
| 6,328,265 B1 | 12/2001 | Dizdarevic |
| 6,592,072 B1 | 7/2003 | Gregg, III et al. |

OTHER PUBLICATIONS

Optimization Techniques in Airfoil Design, Mark Drela, MIT Aero & Astro.

PCT International Search Report for App. No. PCT/US03/32060, dated Feb. 18, 2004, 4 pages.

* cited by examiner

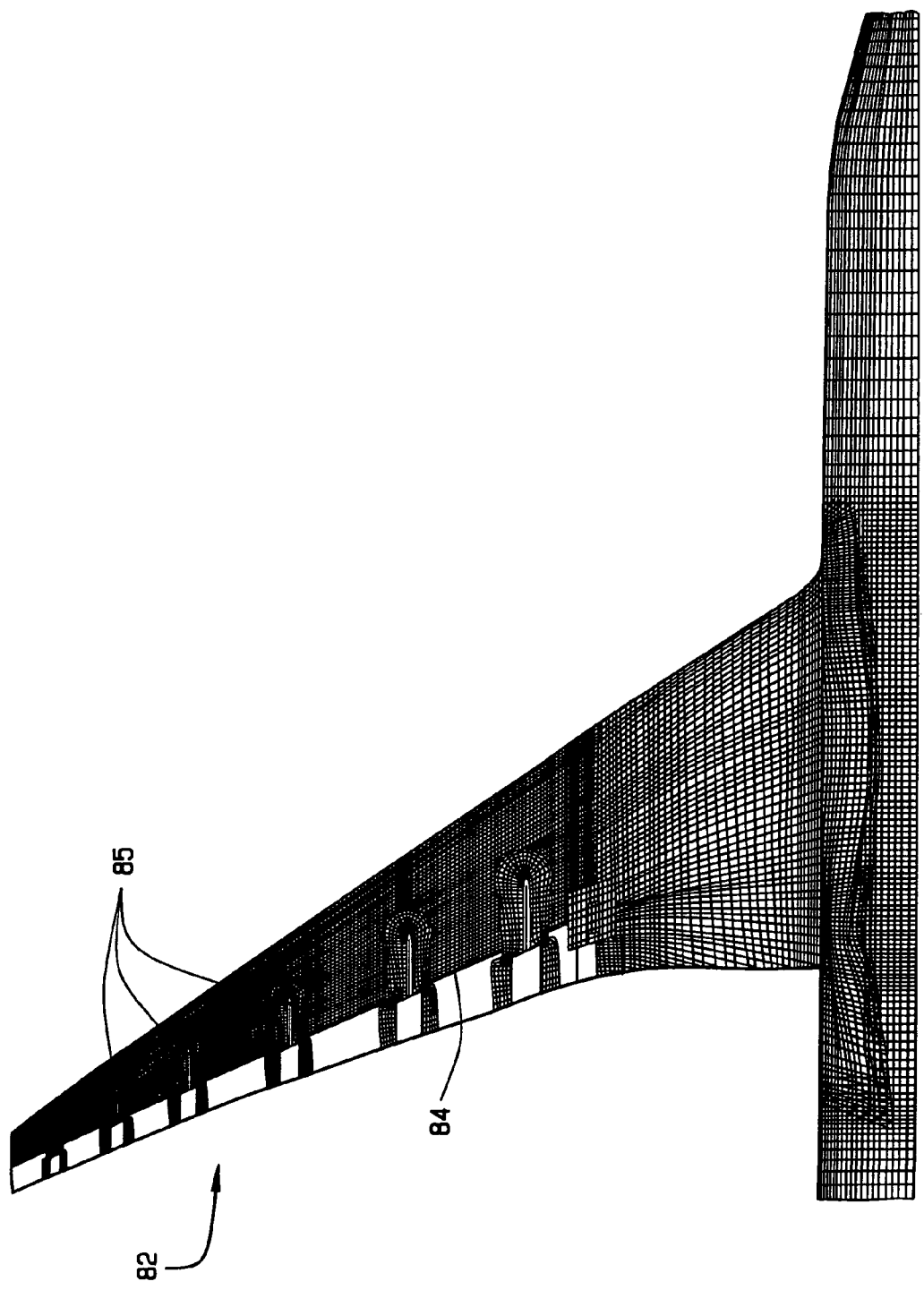

SLOTTED AIRCRAFT WING

CROSS-REFERENCE TO RELATED APPLICATIONS

This application claims the benefit of U.S. Provisional Patent Application No. 60/417,355, filed on Oct. 9, 2002, the contents of which are incorporated herein by reference in their entirety.

ORIGIN

The invention described herein was made in part by employees of the United States Government and may be manufactured and used by and for the Government of the United States for governmental purposes without the payment of any royalties thereon or therefor.

FIELD

The invention relates generally to aircraft and more particularly to slotted aircraft wings and to methods for improving aircraft cruise performance.

BACKGROUND

Many aircraft wings are designed using conventional airfoils. With a conventional airfoil, the upper and lower surfaces come together at a blunt or rounded leading edge (LE) and at a sharp trailing edge (TE).

Conventional airfoils are also used for transonic wings (i.e., wings designed for transonic flight). Transonic flight occurs when the airflow velocity over an aircraft is a mixture of subsonic flow (i.e., flow velocity less than the speed of sound) and supersonic flow (i.e. flow velocity greater than the speed of sound). Air flowing over the upper surface of a wing is accelerated by the upper surface curvature used to produce lift. As a result, the speed of the aircraft at which a portion of the airflow over the aircraft reaches the speed of sound (i.e., becomes sonic) may be considerably less than Mach one.

Briefly, the Mach number is the ratio of the aircraft's airspeed to the speed of sound at the aircraft's current altitude. Mach 1 occurs when the aircraft is flying at the speed of sound. The critical Mach number ($M_{crit}$) is the Mach number of the aircraft's airspeed at which the airflow at some place along the aircraft reaches the speed of sound.

When the airflow over any portion of the aircraft does reach the speed of sound, a shock wave may be generated at that point. If the aircraft's Mach number increases above the critical Mach number, supersonic flow may be created over both the upper and lower surfaces of the airfoil resulting in the generation of shock waves at each of the airfoil locations. At transonic speeds, there are often several localized areas of supersonic flow delimited by shock waves.

Across a shock, the pressure and density of air increases significantly resulting in non-isentropic or irrecoverable losses that are classified as wave drag. As the Mach number of the aircraft is increased, a dramatic and abrupt increase in drag occurs which is referred to as the transonic drag rise. A shock wave slows the airflow and thus increases pressure leading to an adverse pressure gradient across the shock wave. Depending on the strength of the shock wave, the adverse pressure gradient may cause a localized separation of the airflow from the surface of the airfoil at the base of the shock wave. During transonic flight, shock waves and shock-induced boundary layer separation are consistent and significant sources of an aircraft's total drag.

The Mach number at which the transonic drag begins to substantially increase is known as the "drag-divergence Mach number" ($M_{dd}$). Because slight increases in the aircraft's Mach number beyond the drag-divergence Mach number can lead to significant increases in the drag on the aircraft, operating at such conditions is not usually economically practical.

To push the transonic drag rise toward higher Mach numbers and thus reduce wave drag at a given transonic speed, several methods have been employed. Some of the more common methods include using highly swept wings which can be relatively costly to manufacture, thin airfoils, and aft-camber airfoils. Supercritical airfoils have been created with higher critical Mach numbers. Supercritical airfoils typically have flattened upper surfaces to reduce flow acceleration and a highly cambered aft section to generate a significant portion of the lift. The aft-loaded wings shift the center of lift back resulting in larger nose-down pitching moments. Ultimately, an increase in nose-down pitching moments requires that both the wing and the horizontal tail work harder to trim the aircraft in flight. The drag associated with trimming the vehicle is referred to as trim drag. A larger nose-down pitching moment typically increases trim drag.

There is a limit to how thin a practical airfoil can be due to considerations other than aerodynamics. For example, thinner wings provide less fuel capacity. Moreover, the use of thinner airfoils usually increases the overall weight of the wing because thinner wings have shallower structural boxes.

Larger wings can also be used to increase the drag-divergence Mach number and thus reduce wave drag for a given transonic airspeed. With a larger wing area, airfoils having lower lift coefficients may be used, which in turn leads to less wave drag. However, the increased wetted area of a larger wing usually increases the wing's skin friction drag to such an extent that the additional skin friction drag offsets or outweighs any wave drag reductions.

U.S. Pat. No. 6,293,497 entitled "Airplane with Unswept Slotted Cruise Wing Airfoil" discloses an unswept, or substantially unswept, wing that employs slotted cruise airfoil technology to achieve higher cruise speeds comparable with that of swept un-slotted aircraft wings and to achieve higher lift at lower speeds. The contents of U.S. Pat. No. 6,293,497 are incorporated herein by reference in their entirety as if fully set forth herein.

SUMMARY

A swept aircraft wing includes at least one leading airfoil element and at least one trailing airfoil element. At least one full-span slot is defined by the wing during at least one transonic condition of the wing. The slot allows a portion of the air flowing along the lower surface of the leading airfoil element to split and flow over the upper surface of the trailing airfoil element so as to achieve a performance improvement in the transonic condition.

In another form, the invention provides methods for flying an aircraft wing. In one embodiment, a method generally includes trimming a full-span slot defined between a leading airfoil element and trailing airfoil element during at least one transonic condition so as to achieve a performance improvement in the transonic condition.

In another embodiment, a method for flying a swept wing generally includes using a full-span slot to divert a portion of the air flowing along a lower surface of the wing to split and flow over an upper surface of the wing during at least one transonic condition of the aircraft wing. Diverting the air at least delays the airflow separation that would occur to add drag so as to achieve a performance improvement in the transonic condition.

In a further embodiment, a method for flying an aircraft wing having a main wing portion, a flap assembly, and at least one full-span slot defined between the main wing portion and the flap assembly during cruise generally includes actuating the flap assembly during cruise to trim the flap assembly so as to achieve a performance improvement during cruise.

Further areas of applicability of the invention will become apparent from the detailed description provided hereinafter. It should be understood that the detailed description and specific examples, while indicating at least one exemplary embodiment of the invention, are intended for purposes of illustration only and are not intended to limit the scope of the invention.

BRIEF DESCRIPTION OF THE DRAWINGS

The invention will be more fully understood from the detailed description and the accompanying drawings, wherein:

FIG. 18A is a perspective view of a finite element model of a partial-span slotted wing in accordance with the teachings of at least one embodiment of the invention;

DETAILED DESCRIPTION OF THE EXEMPLARY EMBODIMENTS

Figure 1:
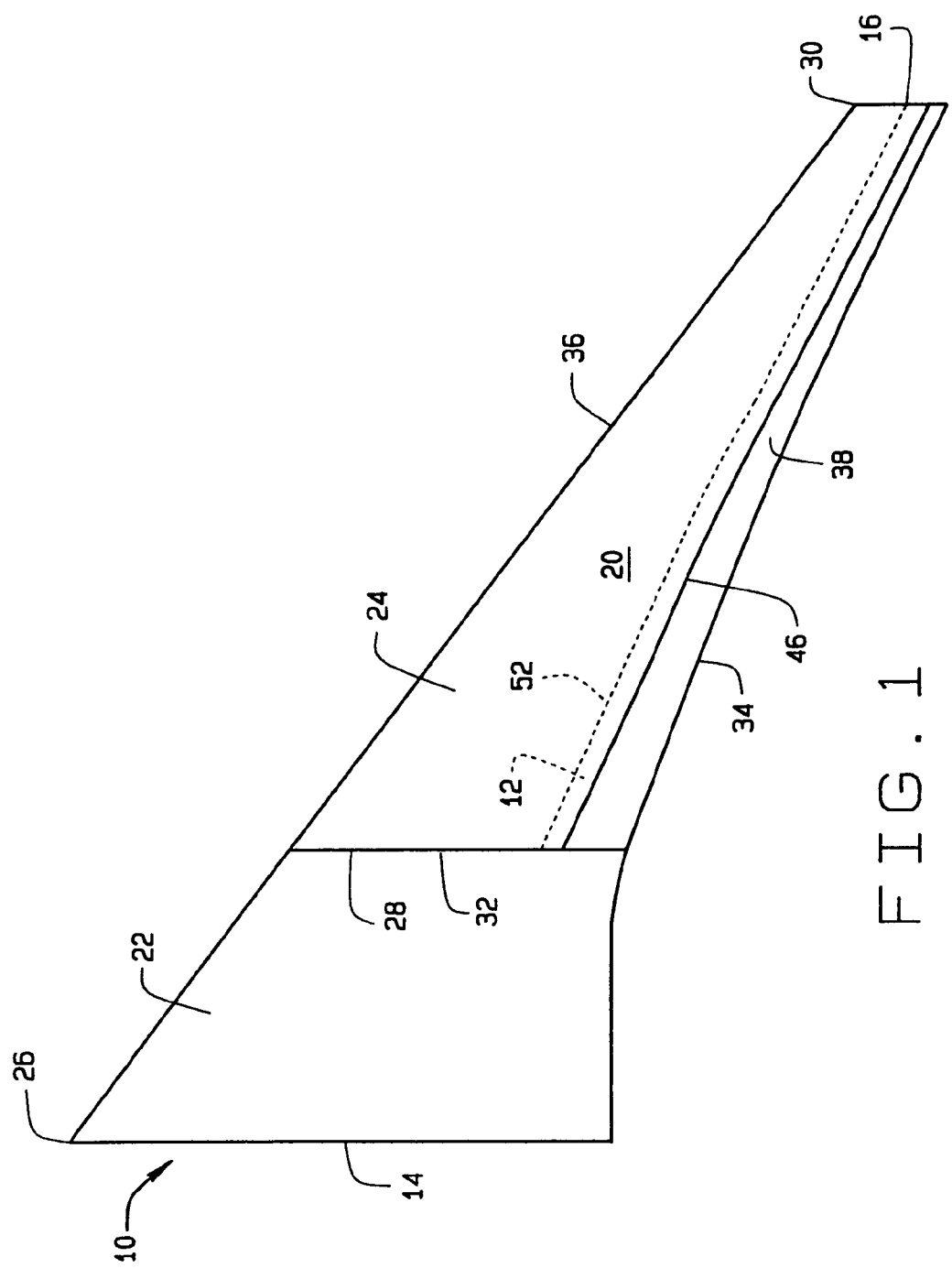
FIG. 1 is an upper view of a swept wing including a partial-span slot according to one embodiment of the invention.

The following description of various embodiments of the invention is merely exemplary in nature and is in no way intended to limit the invention, its application, or uses. For example, it is anticipated that embodiments of the invention will be applicable to any of a wide range of aircraft (e.g., but not limited to, fighter jets, commercial jets, private jets, supersonic dash aircraft, among others) regardless of the manner in which the aircraft is piloted (e.g., directly, remotely, via automation, or in a combination thereof, among others). Accordingly, the specific references to aircraft herein should not be construed as limiting the scope of the invention. In addition, it is also anticipated that embodiments of the invention will be applicable to any of a wide range of lift-producing surfaces for aircraft (e.g., but not limited to, fixed wings, variable geometry wings, rotary wings, right semi-span wings, left semi-span wings, full-span wings, straight wings, swept wings, delta wings, horizontal tails, tapered wings, untapered wings, slanted wings, among others). Accordingly, the specific references to wing herein should not be construed as limiting the scope of the invention.

In addition, certain terminology will also be used in the following description for the purpose of reference only, and thus are not intended to be limiting. For example, terms such as "upper", "lower", "above", and "below" refer to directions in the drawings to which reference is made. Terms such as "front", "back", "rear", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

FIG. 1 illustrates a swept aircraft wing 10 according to one embodiment of the invention. As shown, the swept wing 10 includes a leading airfoil element 36 and a trailing airfoil element 38. At least one partial-span slot 12 is defined between the leading and trailing airfoil elements 36 and 38 during at least one transonic condition of the wing 10.

Figure 2:
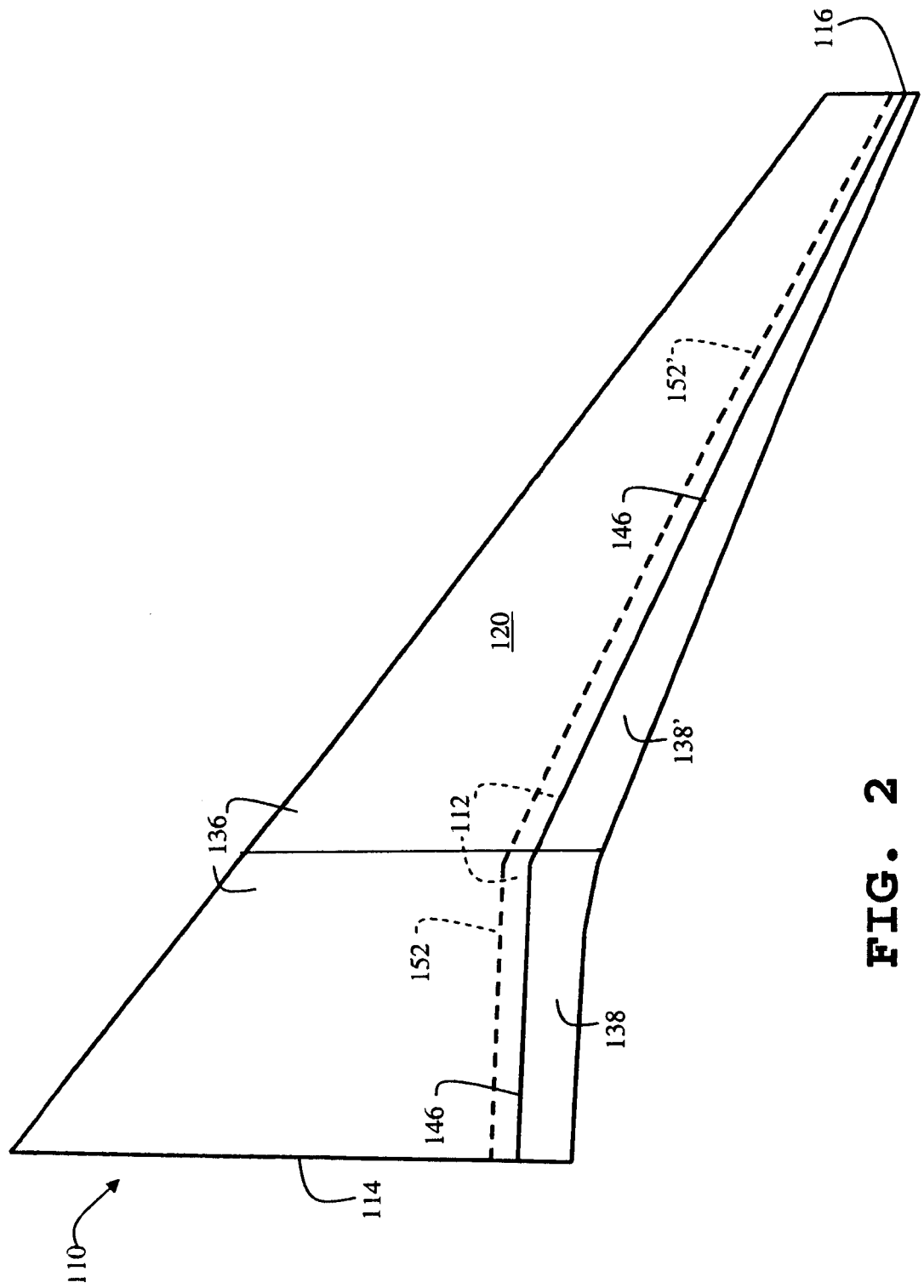
FIG. 2 is an upper view of a swept wing including a full-span slot according to another embodiment of the invention.

FIG. 2 illustrates another embodiment of a swept wing 110. As shown, the swept wing 110 includes a leading airfoil element 136 and a trailing airfoil element 138. At least one full-span slot 112 is defined between the leading and trailing airfoil elements 136 and 138 during at least one transonic condition of the wing 1 10.

The partial-span slot 12 and the full-span slot 112 allow a portion of the air flowing along a lower surface of the leading element 36, 136 to split and flow over the upper surface 20, 120 of the trailing element 38, 138 to improve wing performance during one or more phase(s) of flight in which the wing is operating within or near the wing's transonic drag rise or near the high-speed buffet boundary, of which a transonic cruise condition and transonic maneuvering are examples. In at least some embodiments, the partial-span slot 12 and the full-span slot 112 each include an aerodynamically smooth channel defined between the leading and trailing airfoil elements without an unfaired cove (a cove that is not streamlined), as described below.

As used herein, a "partial-span slot" refers to and includes one or more slots each extending spanwise along only a portion of a span of the wing. That is, the partial-span slotted wing does not have a single slot that extends entirely from the wing root to the wing tip. In an exemplary embodiment, the partial-span slotted wing has a slot that preferably begins about or slightly inboard of midspan and extends thereafter outward to the wingtip, at least until tip effects greatly diminish or overwhelm the effect of the slot. An exemplary wing 10 having a partial-span slot 12 is shown in FIG. 1.

A "full-span slot", as used herein, refers to and includes a slot that extends continuously essentially from as close to the wing root as a slot will provide benefit to essentially the wingtip (at least until where tip effects degrade slot performance), excepting the necessary support brackets connecting the elements of the wing structure positioned ahead of and behind the full-span slot. Such support brackets typically interrupt the entrance of a full-span slot on the lower wing surface but do not interrupt the exit of the full-span slot on the upper wing surface. FIG. 2 illustrates an exemplary full-span slot 112 extending from a wing root 114 to a wing tip 116.

Figures 3, 4:
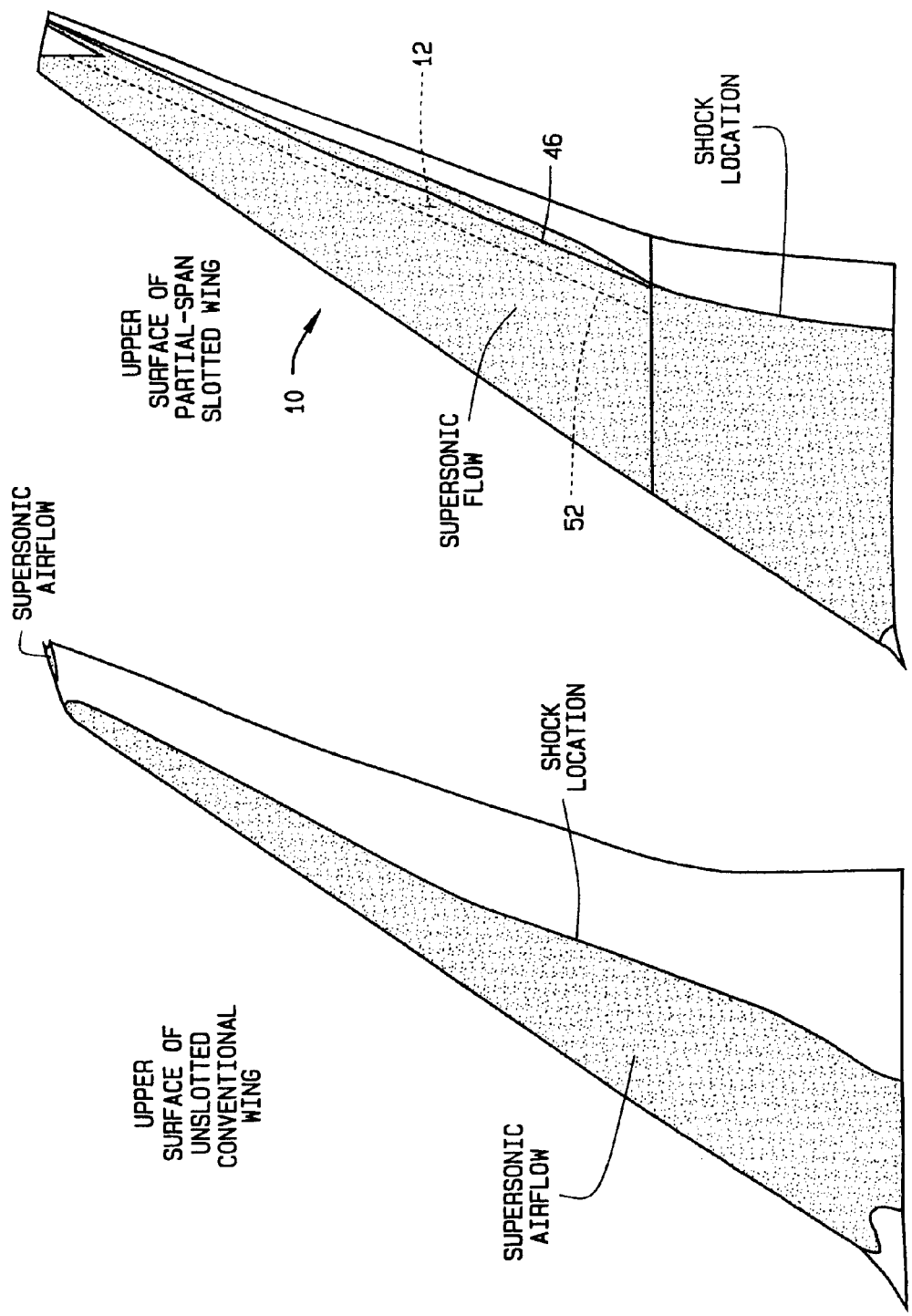
FIG. 3 is an upper view of a conventional un-slotted conventional wing illustrating shock location and regions of supersonic airflow at mid-cruise lift coefficient and Mach.
FIG. 4 is an upper view of the partial-span slotted wing shown in FIG. 1 illustrating shock location and regions of supersonic airflow at mid-cruise lift coefficient and Mach.
Figure 5:
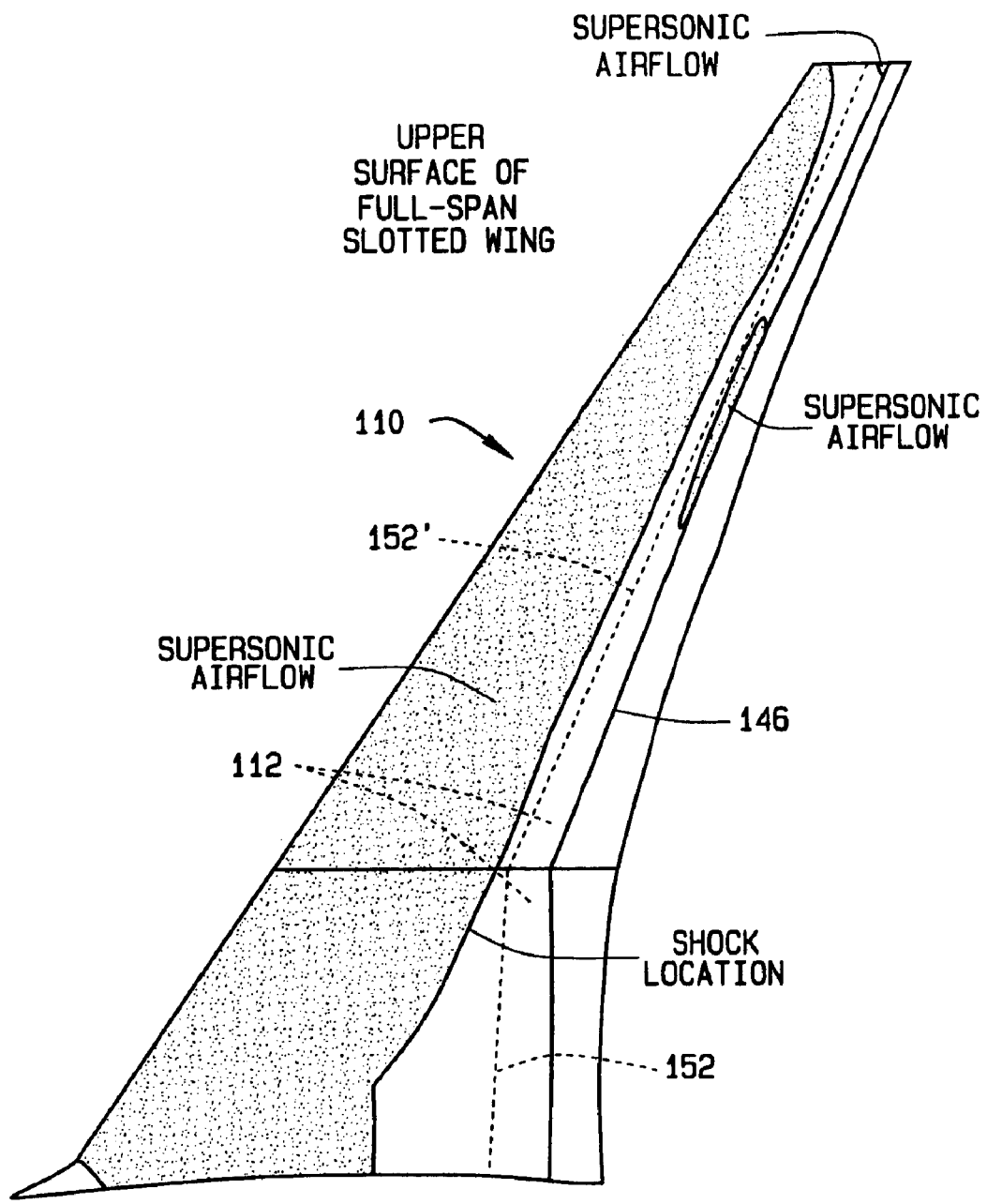
FIG. 5 is an upper view of the full-span slotted wing shown in FIG. 2 illustrating shock location and regions of supersonic airflow at mid-cruise lift coefficient and Mach.

As used herein, "transonic cruise condition" refers to and includes a relatively high-speed phase of a wing such that the airflow past the wing contains localized regions of supersonic flow as shown, for example, in FIGS. 3, 4, and 5. In other words, the wing is cruising at a relatively high-speed that is within or near its transonic drag rise or near the high-speed buffet boundary. In addition, "transonic conditions" as used herein refers to and includes one or more phase(s) of flight in which the wing is operating, but not necessarily cruising, within or near its transonic drag rise or near the high-speed buffet boundary. Exemplary transonic conditions for the wing include, but are not limited to, transonic cruise condition and transonic maneuvering.

FIGS. 1 and 2 are simplified planform illustrations of current right wing designs for commercial aircraft that have been provided with a partial-span slot and full-span slot, respectively. The commercial aircraft would also include a left wing having essentially the same performance in the flight envelope. Accordingly, the left wing (not shown) is usually provided with an equivalent or corresponding slot when the right wing is provided with a slot.

Figure 11:
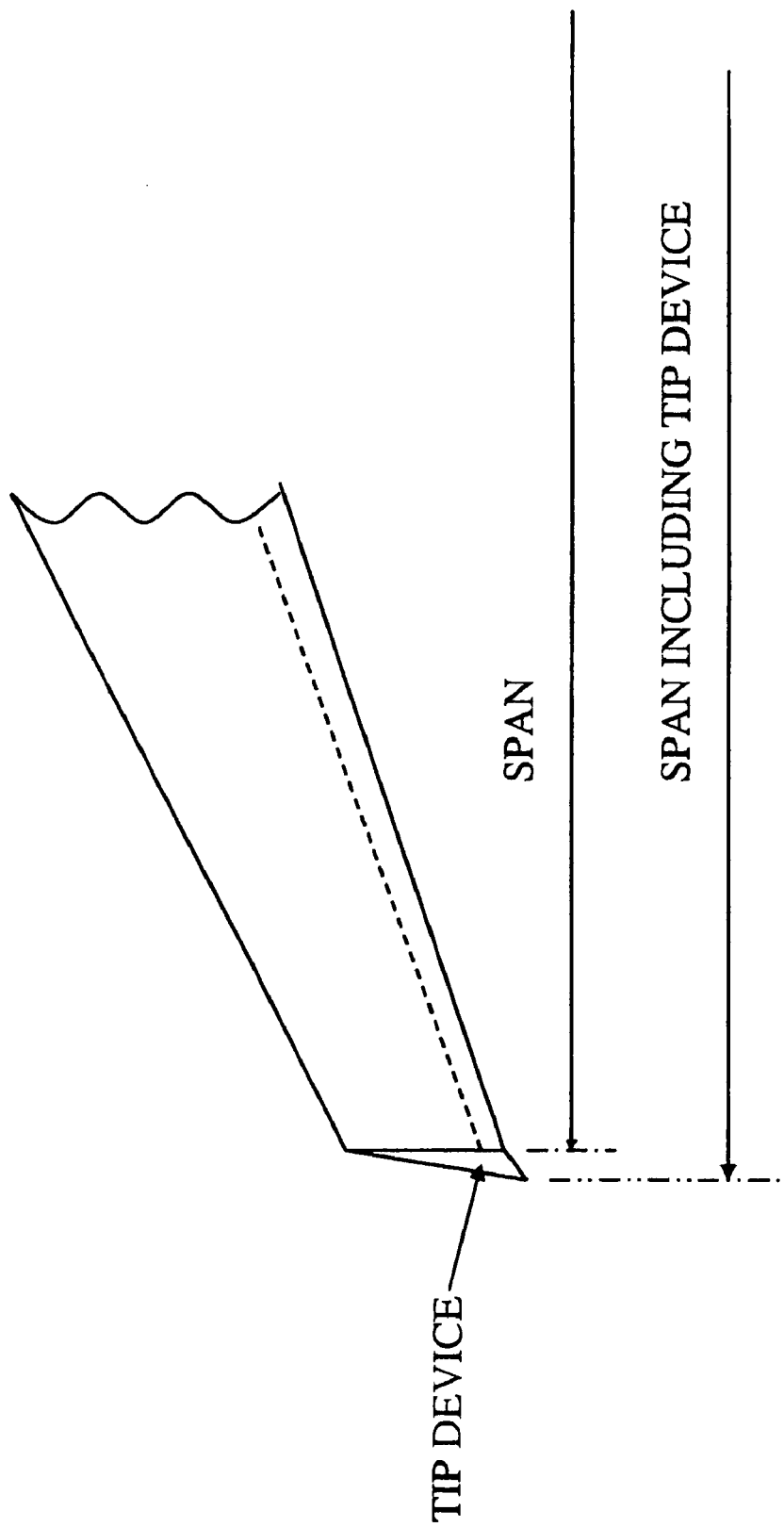
FIG. 11 is an upper view of a slotted wing including a tip device according to another embodiment of the invention.

Regarding nomenclature for semi-span wings (i.e., right and left wings), the 0% semi-span station is commonly known as the location about which the right and left wings are symmetric or mirror images. Typically, the 0% semi-span station is located at the center of the fuselage to which the wings are attached. When dealing with semi-span wings, the term semi-span refers to the distance from the 0% semi-span station to the 100% semi-span station located at the wing tip. It should be noted, however, that embodiments of the invention should not be limited to semi-span wings but are equally applicable to full-span wings (e.g., flying wings, among others). In addition, and as shown in FIG. 11, the terms "span" and "semi-span" as used herein do not include one or more tip devices that may be installed or provided at a wing tip. However, such should not be construed as limiting the scope of the invention in that it is anticipated that embodiments of the invention will be applicable to any of a wide range of wings including, but not limited to, wings having tip devices and wings without tip devices. Indeed, in other embodiments, the tip device may define at least a portion of either a partial-span or full-span slot.

With further reference to FIG. 1, the partial-span slot 12 may extend spanwise along a portion of the semi-span of the wing 10 where airflow separation would occur to add drag during the transonic condition of the wing 10. The partial-span slot 12 can be located where a computational fluid dynamics (CFD) simulation of a three-dimensional airflow over the wing 10 suggests that a pressure field will result in airflow separation on the upper wing surface 20.

In the illustrated embodiment, the partial-span slot 12 extends from about a semi-span station 28 to about a semi-span station 30. The semi-span stations 28 and 30 coincide with the Yehudi or planform break 32 and the wing tip 16, respectively, although such need not be the case. In other embodiments, the partial-span slot 12 can begin at other inboard locations where its inclusion does not interfere with the low-speed control surfaces or the integration of other elements such as fuel tanks and landing gear into the planform of the wing 10. In addition, the partial-span slot need not extend entirely to the wing tip. Instead, the partial-span slot may extend essentially to the wing tip but stop when tip effects obscure the improved performance provided by the slot.

The particular chordwise location for the partial-span slot 12 as well as for the full-span slot 112 (FIG. 2) will likely be determined at least in part by considerations such as the particular low-speed control surfaces and the integration of other elements such as fuel tanks and landing gear into the planform of the wing. In one exemplary embodiment, the chordwise location of each slot 12 and 112 is located at about seventy percent (70%) to about ninety percent (90%) chord.

In use, each slot 12 and 112 allows a portion of the air flowing along a lower surface 18 of the leading airfoil element 36, 136 to split and flow over an upper surface 20, 120 of the trailing airfoil element 38, 138. In doing so, the slot at least delays boundary-layer separation and pushes the shock waves generated by the supersonic airflow further aft on the wing. The effect ("the slot effect") that the presence of a slot has on the supersonic airflow (represented by the regions B) and shock wave location (represented by solid lines A) across an upper wing surface can be seen by comparing FIGS. 3 (un-slotted wing), 4 (partial-span slotted wing), and 5 (full-span slotted wing). This "slot effect" improves performance of the wing during the transonic condition as described below.

The manner in which the "slot effect" prevents, or at least delays, boundary-layer separation is described below and in detail in U.S. Pat. No. 6,293,497 entitled "Airplane with Unswept Slotted Cruise Wing Airfoil". The contents of U.S. Pat. No. 6,293,497 are incorporated herein by reference in their entirety as if fully set forth herein.

With further reference to FIG. 1, the partial-span slotted wing 10 comprises at least one wing region 22 that does not define a slot and at least one other region 24 that does define at least one partial-span slot 12. For ease of identification and presentation and not for purposes of limitation, the wing region 22 will also be referred to as the un-slotted wing region 22 because the un-slotted wing region 22 does not define a slot, whereas the wing region 24 will also be referred to as the slotted wing region 24 because the slotted wing region 24 does define at least one partial-span slot 12. It should be noted, however, that either or both of the wing regions 22 and 24 may comprise any number of (i.e., one or more) slots, some of which may be created only upon deployment of high lift devices and/or stability and control devices such as slats, ailerons, flaps, spoilers, etc.

As shown, the un-slotted wing region 22 is disposed spanwise between the semi-span stations 26 and 28, whereas the slotted wing region 24 is disposed between the semi-span stations 28 and 30. The semi-span stations 26, 28, and 30 coincide with the wing root 14, a planform break 32, and the wing tip 16, respectively, although such is not required.

The slotted wing region 24 can be provided only at the regions of the wing that will become Mach number critical at a relatively high cruising speed. A process for determining which portions of a wing will become Mach critical during cruise is described below. The remaining wing regions where the Mach number is not going to become critical may comprise the un-slotted wing regions 22.

In the present example, the un-slotted wing region 22 is shown to be disposed inboard of the planform break 32 (e.g., adjacent the fuselage). To allow for retraction of the landing gear for commercial aircraft, the inboard regions of the commercial aircraft's wings are typically sized with relatively long chords. With the relatively long chords, the associated wave drag is usually minimal for the inboard portions because the airfoils have relatively low sectional lift coefficients ($C_l$) as compared to that of the entire commercial aircraft wing. If the inboard portions do not become Mach number critical during cruise, then the increases in Mach number capability provided by the partial-span slot 12 are not necessarily needed there. Accordingly, the un-slotted wing region 22 may be disposed at the inboard wing portions that do not become Mach number critical during cruise to avoid or mitigate the profile drag penalty associated with the use of a partial-span slot where increased Mach number capability is not needed during cruise. In addition, the use of the un-slotted wing region 22 for the inboard portion allows a more conventional high-lift system (e.g., conventional flaps and slats) to be used on the inboard portion of the wing 10, which is an additional advantage provided by embodiments of the invention. In addition, it should be noted that embodiments of the invention should not be construed as limited to wings having inboard portions that do not become Mach number critical during cruise. Indeed, it is anticipated that embodiments of the invention will be applicable to a wide range of wings including, but not limited to, wings having inboard portions that become Mach number critical during cruise and wings having inboard portions that do not become Mach number critical during cruise.

Although the partial-span slotted wing 10 is shown and described as having a single un-slotted wing region 22 and a single slotted wing region 24, such is not required. The partial-span slotted wing 10 may be provided with any number of (i.e., one or more) un-slotted wing regions 22 and any number of slotted wing regions 24 each of which may include any number of slots without departing from the spirit and scope of the invention. Transitioning between slotted and un-slotted wing regions 22 and 24 may occur multiple times across the semi-span of a wing with the particular requirements of the wing design likely dictating whether more than one un-slotted wing region and/or more than one slotted wing region will be used. For example, another embodiment of the partial-span slotted wing includes an inboard un-slotted wing region, a medial slotted wing region, and another un-slotted wing region disposed between the wing tip and the slotted wing region.

Figure 6:
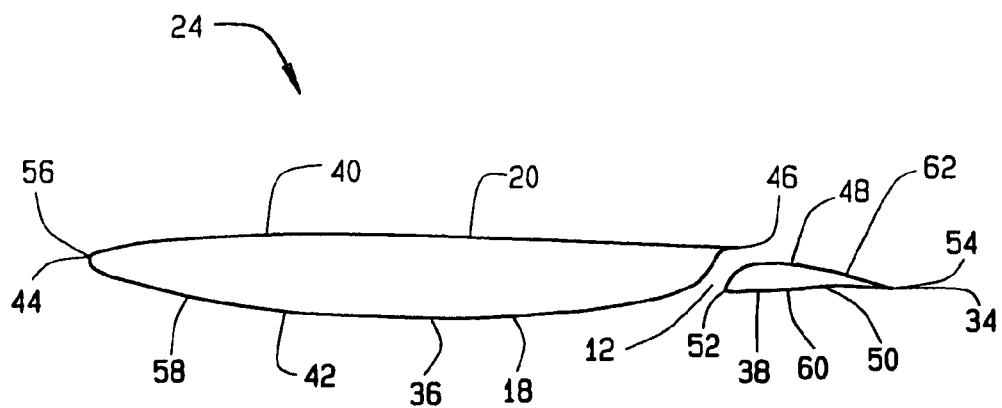
FIG. 6 is a cross-sectional side view of the wing in FIG. 1 showing the leading and trailing airfoil sections of the slotted wing region at the planform break while configured for cruise flight according to one embodiment of the invention.

FIG. 6 illustrates the airfoil sections at the planform break 32 of the leading and trailing airfoil elements 36 and 38 of the wing 10. The leading airfoil element 36 includes an upper surface 40, a lower surface 42, a leading edge 44, and a trailing edge 46. Similarly, the trailing airfoil element 38 also includes an upper surface 48, a lower surface 50, a leading edge 52, and a trailing edge 54. The partial-span slot 12 is defined between the trailing edge 46 of the leading airfoil element 36 and the leading edge 52 of the trailing airfoil element 38. The cross-section of the partial-span slot 12 is shown as the gap or space separating the trailing edge 46 of the leading airfoil element 36 from the leading edge 52 of the trailing airfoil element 38. During flight, the partial-span slot 12 allows a portion of the air flowing along the lower surface 42 of the leading airfoil element 36 to split and flow over the upper surface 48 of the trailing airfoil element 38.

With further reference to FIG. 6, a portion of the leading airfoil element 36 overlaps or overhangs a portion of the trailing airfoil element 38. Accordingly, the sum of the chords of the leading and trailing airfoil elements 36 and 38 exceed one hundred percent (100%) of the chord of the slotted wing region 24 (i.e., the distance separating the extreme leading edge 56 from the extreme trailing edge 34). In at least one embodiment, the gap is minimized but sufficiently sized such that the boundary layer along the lower surface 42 of the leading airfoil element 36 does not mix or become confluent with the boundary layer over the upper surface 48 of the trailing airfoil element 38.

Figure 7:
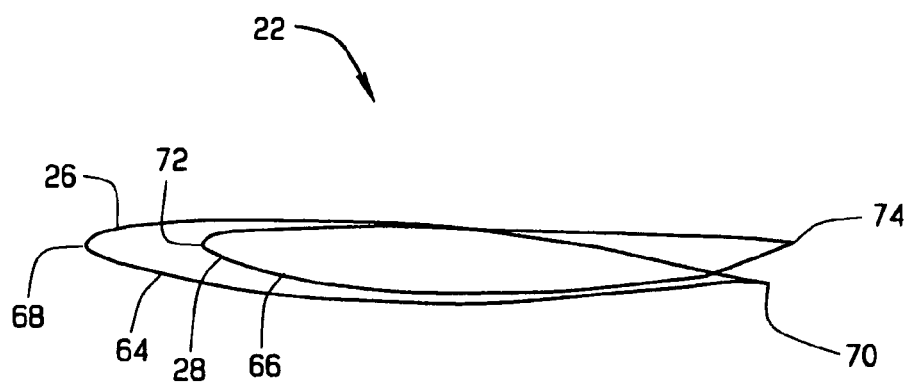
FIG. 7 is a cross-sectional side view of the wing in FIG. 1 showing the airfoil sections of the un-slotted wing region at the root and at the planform break according to one embodiment of the invention.

FIG. 7 is a cross-sectional side view of the un-slotted wing region showing the airfoil section 64 at the semi-span station 26 overlaying the airfoil section 66 of the un-slotted wing region 22 at the semi-span station 28 or planform break 32. As a result of the backward sweep and taper of the un-slotted wing region 22, the leading and trailing edges 68 and 70 of the root airfoil section 64 may be disposed forward of the leading and trailing edges 72 and 74 of the airfoil section 66 at the planform break 32.

Figure 8:
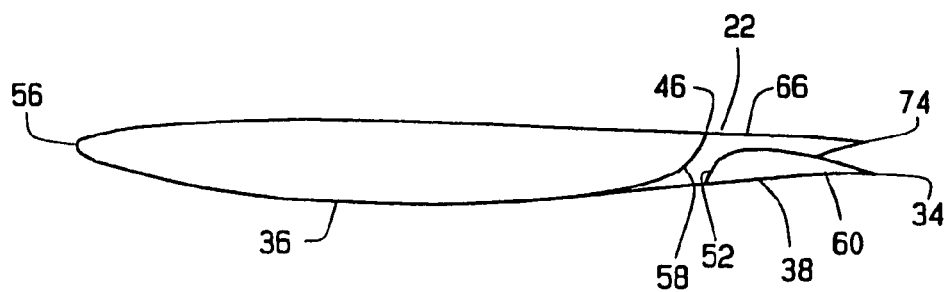
FIG. 8 illustrates the leading and trailing airfoil sections shown in FIG. 6 superimposed upon the airfoil section at the planform break shown in FIG. 7.

FIG. 8 is cross-sectional side view of the slotted wing region 24 showing its leading and trailing airfoil sections 36 and 38 at the planform break 32, as shown in FIG. 6, overlaying the airfoil section 66 of the un-slotted wing region 22 at the planform break 32, as shown in FIG. 7. At the planform break 32, the leading edge 72 of the un-slotted wing region 22 transitions relatively smoothly into the extreme leading edge 56 of the slotted wing region 24. The trailing edge 46 of the main wing portion 58 of the slotted wing region 24 transitions relatively smoothly into the upper surface of the un-slotted wing region 22 at the planform break 32. Also at the planform break 32, the extreme trailing edge 34 of the slotted wing region 24 is offset downward from the trailing edge 74 of the un-slotted wing region 22 by an appropriate amount to allow the air passing through the partial-span slot 12 to pass above the extreme trailing edge 34 of the slotted wing region 24.

The partial-span slot 12 may begin rather abruptly at the planform break 32. That is, the gap which separates the trailing edge 46 of the leading airfoil element 36 from the leading edge 52 of the trailing airfoil element 38 is not tapered and does not gradually increase in size from the planform break 32. Accordingly, there is not a relatively smooth transition from the un-slotted wing region 22 to the slotted wing region 24 at the planform break 32 where the partial-span 12 begins. It should be noted, however, that other embodiments may include a partial-span slot 12 that begins gradually or is tapered such that the un-slotted wing region 22 transitions relatively smoothly to the slotted wing region 24 at the planform break 32 where the partial-span slot 12 is located.

In at least one embodiment, the gap at the planform break 32 is sealed, for example, with a plate (not shown). The plate may be planar and be disposed across the gap such that the plate lines up with the direction of flight.

The partial-span slot 12 may be defined between a main wing portion 58 and a high lift or stability and control device such as a flap 60, aileron, spoiler, etc. In an exemplary embodiment, the partial-span slot 12 is defined between the trailing edge 46 of the main wing portion 58 and the leading edge 52 of the flap 60. The partial-span slot 12 thus allows a portion of the air flowing along the lower surface 42 of the main wing portion 58 to split and flow over the upper surface 48 of the flap 60.

Figure 12:
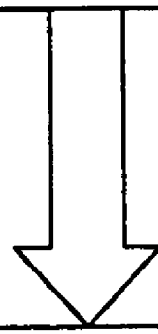
FIG. 12 is a simplified block diagram of an active control system operatively associated with a slotted wing for adjusting and trimming the slot.

The flap 60 may be operatively associated with an active control system 61 (FIG. 12), which in turn is operatively associated with actuator structure, such as the flap actuator structure disclosed in U.S. Pat. No. 5,788,190 entitled "Slotted Cruise Trailing Edge Flap." The contents of U.S. Pat. No. 5,788,190 are incorporated herein by reference in their entirety as if fully set forth herein.

The actuator structure is coupled to the flap 60 and the main wing portion 58 for moving the flap 60 relative to the main wing portion 58 to allow for deployment of the flap 60 and/or to trim the slot 12 for the flight condition. For example, the flap 60 may be moved between a fully-deployed position (not shown) for landing or take-off conditions and a stowed position 62, which is associated with cruise conditions. Or for example, the flap 60 can be moved to narrow or widen the slot 12, the flap 60 can be raised or lowered to change the relative height of the flap 60 to the main wing portion 58, and/or the flap 60 can be rotated to adjust the angle or pitch between the flap 60 and the main wing portion 58.

In FIG. 2, the wing 110 includes the full-span slot 112 which is defined between the trailing edge 146 of main wing structural "box" or element 136 and the leading edge 152, 152' of the inboard flaps and outboard ailerons 138, 138'. As shown, a trailing portion of the main wing element 136 overlaps or overhangs a leading portion of the flaps and ailerons 138, 138'.

Either or both of the flaps 138 and ailerons 138' can be coupled to actuator structure to allow the slot 112 to be trimmed for the particular flight conditions of the wing 110. By way of example, the actuator structure used for adjusting and trimming the slot 112 may comprise the flap actuator structure disclosed in U.S. Pat. No. 5,788,190.

It should be noted that other arrangements for the partial-span slot, the full-span slot and trailing edge systems (e.g., flaps, ailerons, spoilers, etc.) are possible. For example, another embodiment includes a vane-main system in which the slot is defined between the vane and the main flap, with the vane ahead of the slot and the main flap behind the slot.

In at least some embodiments, a closable full-span or partial-span slot is provided that can be closed when the flight conditions warrant it (e.g., low-speed phases such as takeoff, landing, climbing, etc.). Closing the slot mitigates the skin friction drag penalty associated with the slot. During high-speed flight conditions (e.g., transonic cruise conditions), the slot would be partially or fully open.

In other embodiments, the partial or full-span slot can be a permanent feature of the wing such that the slot is not dependent upon the manner in which the various components (e.g., flaps, ailerons, slats, spoilers, other high lift devices, other stability and control devices, etc.) comprising the wing are positioned or configured (e.g., fully deployed, partially deployed, stowed). The presence of the slot may be independent of the aircraft's flight phase (e.g., landing, taking off, climbing, performing a maneuver, cruising, flying level, accelerating, decelerating, etc.). For example, the slot can be implemented as a fixed opening within the moveable parts of the flaps and ailerons such that the slot remains substantially open when the moveable parts are deployed and retracted.

Figure 13:
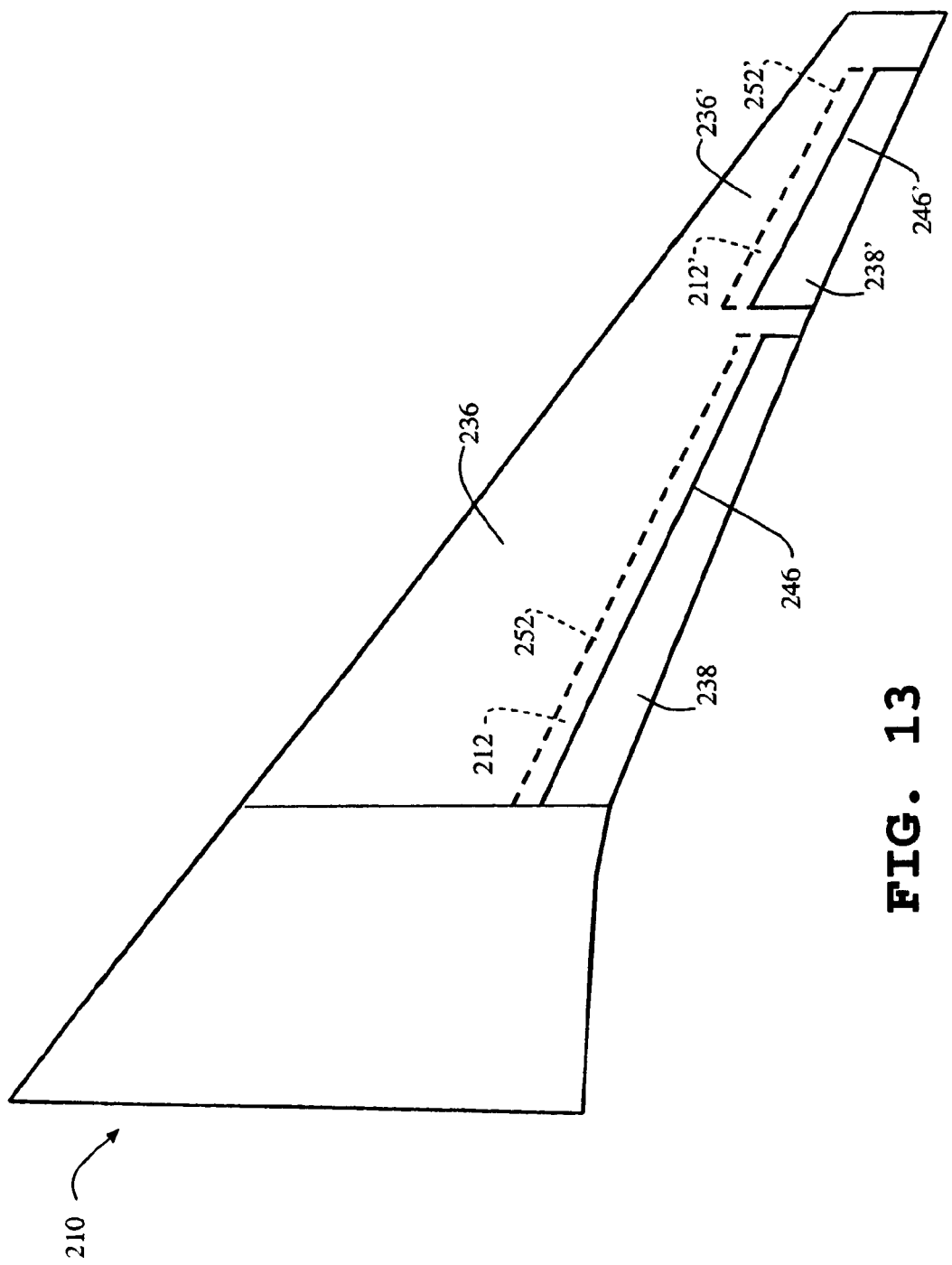
FIG. 13 is an upper view of a wing having two partial-span slots according to another embodiment of the invention.

FIG. 13 illustrates an exemplary embodiment of a swept wing 210 that includes two partial-span slots 212 and 212'. The slot 212 is defined between trailing edge 246 of the leading airfoil element 236 and the leading edge 252 of the trailing airfoil element 238, whereas the slot 212' is defined between trailing edge 246' of the leading airfoil element 236' and the leading edge 252' of the trailing airfoil element 238'.

Figure 14:
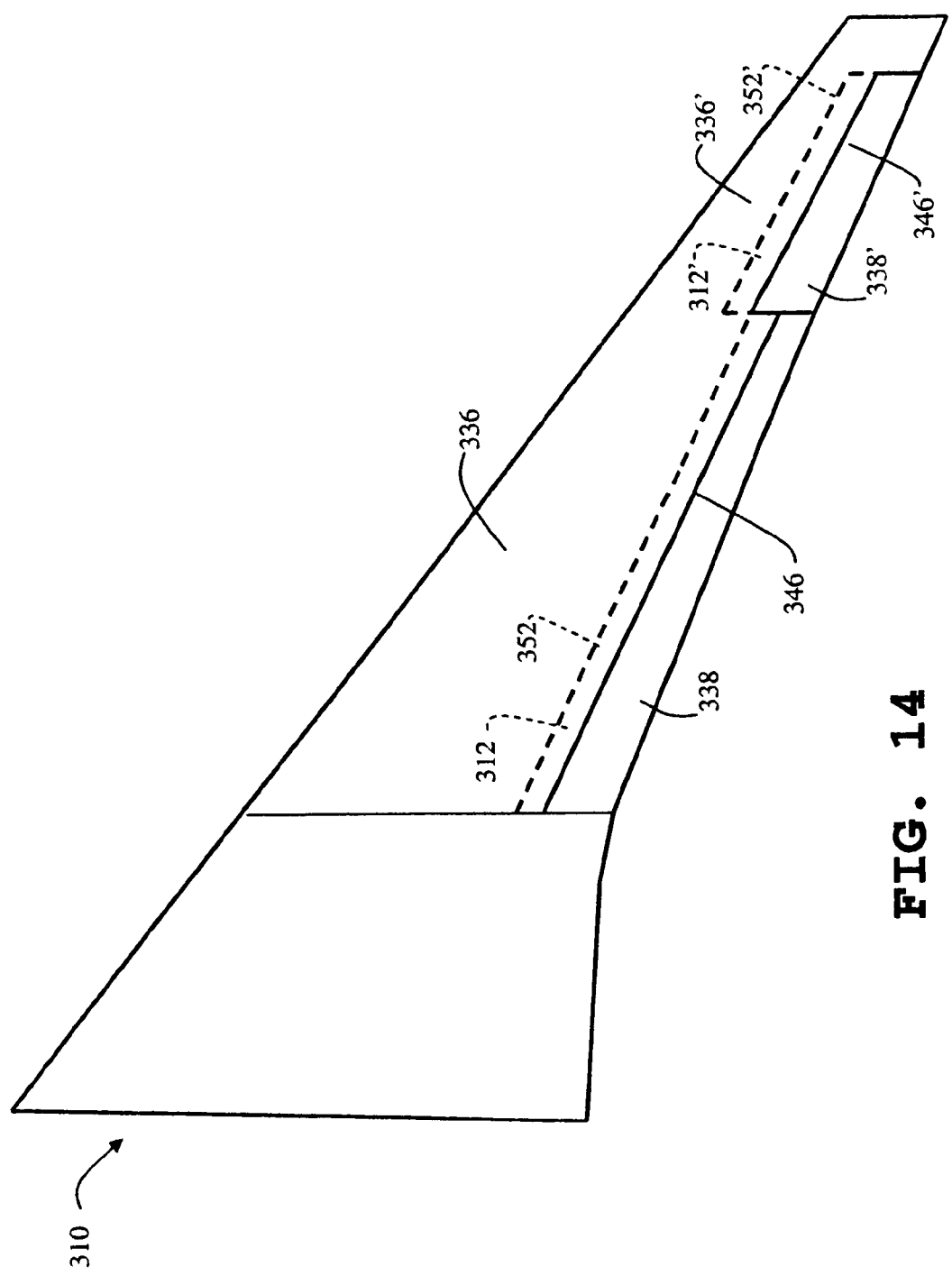
FIG. 14 is an upper view of a wing having two partial-span slots according to another embodiment of the invention.

FIG. 14 illustrates another embodiment of a swept wing 310 that includes two partial-span slots 312 and 312'. The slot 312 is defined between a trailing edge 346 of the leading airfoil element 336 and a leading edge 352 of the trailing airfoil element 338, whereas the slot 312' is defined between trailing edge 346' of the leading airfoil element 336' and the leading edge 352' of the trailing airfoil element 338'.

Figure 15:
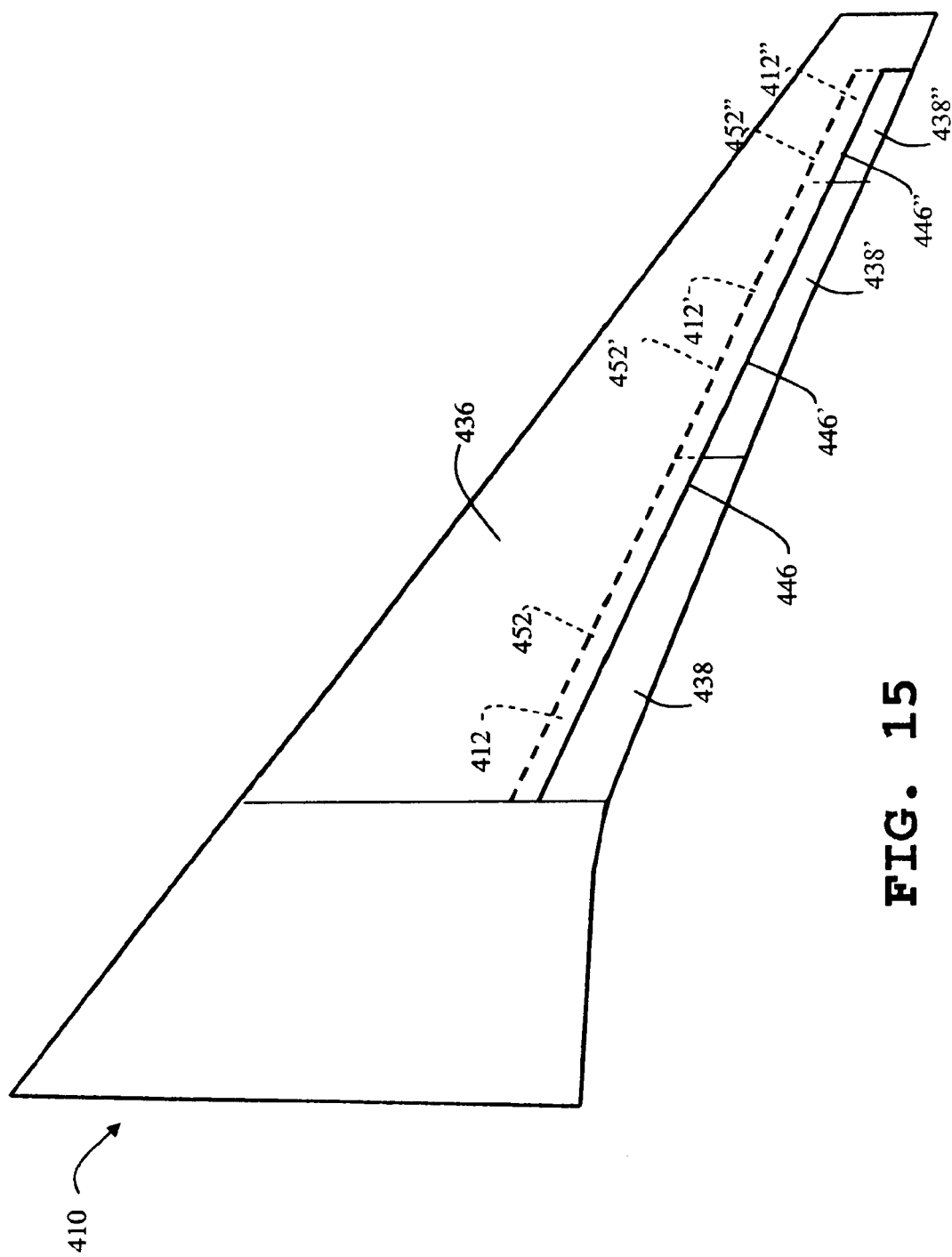
FIG. 15 is an upper view of a slotted wing in which the slot comprises a plurality of independently adjustable segments.

FIG. 15 illustrates another embodiment of a swept wing 410 that includes a slot having a plurality of segments 412, 412', 412" each of which is independently adjustable. As shown, each slot segment 412, 412', 412" is defined between a trailing edge 452, 452', 452" of the main wing structural box 436 and a leading edge 446, 446', 446" of an independently movable high lift or stability and control device 438, 438', 438". Each device 438, 438', 438" is coupled to actuator structure, such as the flap actuator structure described in U.S. Pat. No. 5,788,190. The actuator structure can independently move the device 438, 438', 438" relative to the main wing portion 436 to adjust and trim the slot segments 412, 412', and 412" for the wing's 410 particular flight conditions.

In another form, the invention provides methods for flying an aircraft wing. In one embodiment, a method generally includes trimming a slot defined between a leading airfoil element and a trailing airfoil element during at least one transonic condition so as to achieve a performance improvement in the transonic condition. Trimming the slot may include one or more of the following actions: adjusting a gap separating the leading and trailing airfoil elements, the gap defining the slot; adjusting a relative height between the leading and trailing airfoil elements; and adjusting an angle between the leading and trailing airfoil element. In an exemplary embodiment, the leading and trailing airfoil elements respectively include a main wing portion and a flap assembly, and trimming the slot includes actuating the flap assembly. In at least some embodiments, the method may further include closing, or at least minimizing the width of, the slot if the flight conditions warrant it, such as during subsonic conditions (e.g., takeoff, landing, climb, etc.).

In another embodiment, a method for flying an aircraft wing generally includes using at least one slot defined by the wing to divert a portion of the air flowing along a lower surface of the wing to split and flow over an upper surface of the wing during at least one transonic condition of the wing. Diverting the air prevents, or at least delays, the airflow separation that would occur to add drag at the transonic condition so as to achieve a performance improvement in the transonic condition. It should be noted, however, that the air diversion need not necessarily occur during all flight phases. For example, the method may further comprise closing, or at least minimizing the width of, the slot if the flight conditions warrant it, such as during subsonic conditions (e.g., takeoff, landing, climb, etc.). In addition, the method may also include opening the slot when the wing is at or near a transonic condition. Additionally, the method may also include trimming the slot for the flight condition of the wing.

In a further embodiment, a method for flying an aircraft wing is provided in which the aircraft wing includes a main wing portion, a flap assembly, and at least one slot defined between the main wing portion and the flap assembly during cruise. The method generally includes actuating the flap assembly during cruise to trim the flap assembly so as to achieve a performance improvement during cruise.

The portions of a wing that will become Mach critical will depend at least in part on the wing planform, the thickness distribution, and the spanwise distribution of aerodynamic load (the spanload). To reliably determine which wing portions will become Mach critical, computational modeling having a high degree of fidelity can be used, with such modeling including compressibility effects in full, non-linear form and the effects of the viscous/turbulent boundary layer and wakes. Various levels of simplifying approximations can also be included within the computer modeling, such as methods based on boundary-layer approximation (coupled inviscid/boundary-layer methods) and Navier-Stokes codes which are not "full" but instead employ some level of simplification (e.g., "thin layer" approximation in which some viscous terms with minor effects are omitted).

CFD analysis codes based on "flow solvers" are available which can be used to determine the flow characteristics about a given aerodynamic shape. Thus, when the shape of a particular wing is known, analysis can determine, for example, the degree of Mach criticality of the different portions of the wing or the overall aerodynamic performance of the wing. Exemplary CFD analysis computer software of the coupled inviscid/boundary-layer type is MGAERO available from Analytical Methods, Inc. of Redmond, Washington. Exemplary CFD analysis computer software of the Navier-Stokes type include FLUENT® available from Fluent Inc. Corporation of Lebanon, New Hampshire; CFD++® available from Metacomp Technologies, Inc. of Agoura, Calif.; and NSAERO available from Analytical Methods, Inc. of Redmond, Wash.

Figure 17:
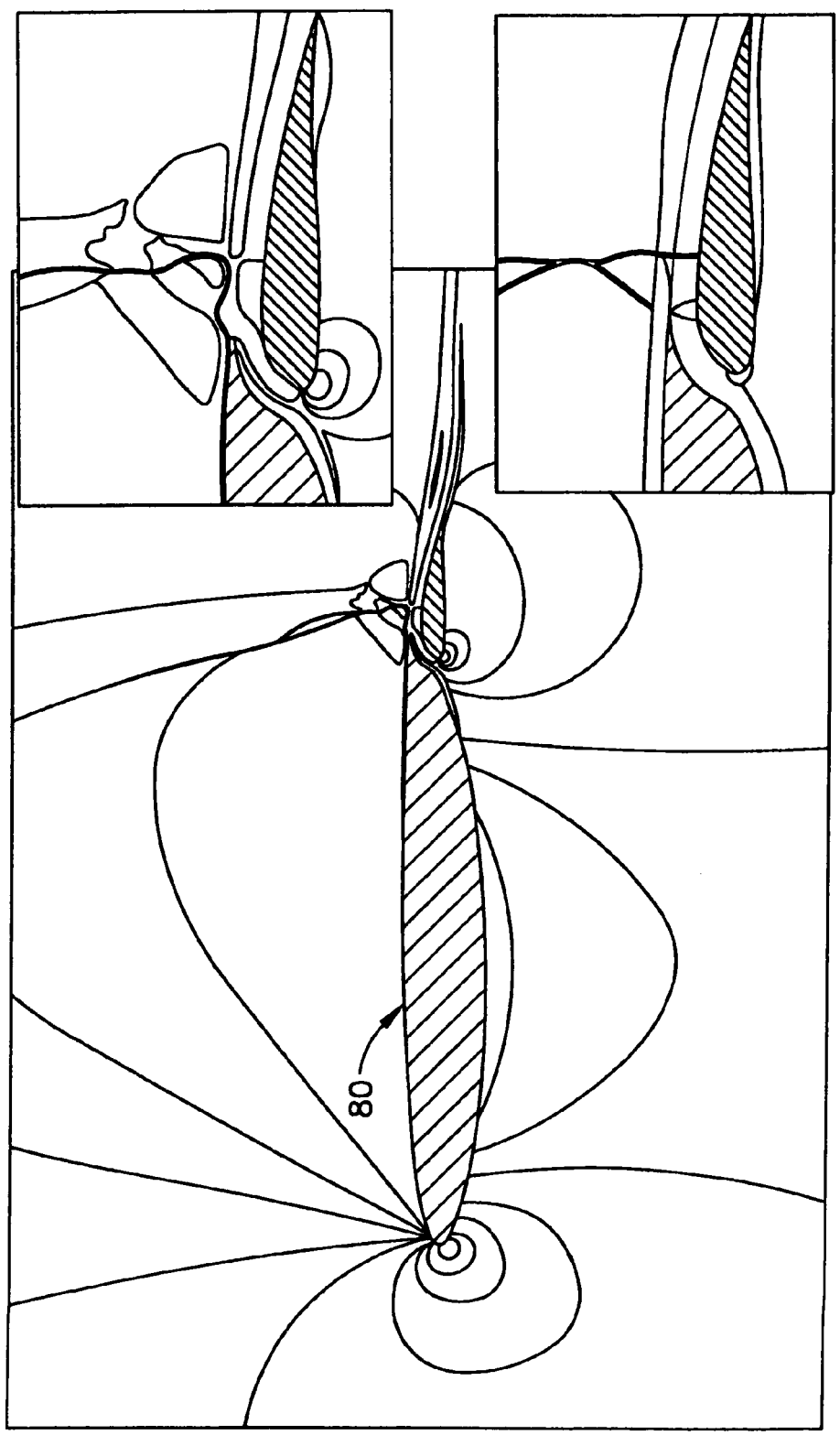
FIG. 17 is a computational fluid dynamics (CFD) model representative of the airflow or pressure fields for a two-dimensional slotted airfoil design.

The performance of the partial-span slotted configuration was analyzed theoretically with computational fluids dynamics (CFD) studies and verified in wind tunnel testing to provide a performance improvement over a conventional transonic wing design. With regard to the CFD modeling, two-dimensional research and analysis has been performed on two-dimensional slotted airfoil designs for a number of years and accordingly is known in the art. In FIG. 17, there is shown a CFD solution representative of the airflow or pressure fields around a two-dimensional slotted airfoil design 80.

Because CFD has not been extended, applied, nor made viable to three dimensional slotted wings, embodiments of the invention involved developing, optimizing and using certain tools and processes for performing detailed three-dimensional CFD design and analyses on slotted wings. Further, and as described below, aspects of the invention also involved validating the CFD output with wind tunnel testing.

As shown in FIGS. 3, 4, and 5, the CFD output includes modeling representative of the shock waves and regions of supersonic flow across a wing at mid-cruise lift coefficient and Mach. Specifically, FIGS. 3, 4, 5 respectively illustrate the shock location and regions of supersonic flow across an upper surface of a conventional wing, a partial-span slotted wing, and a full-span slotted wing at mid-cruise lift coefficient and Mach.

Figure 18B:
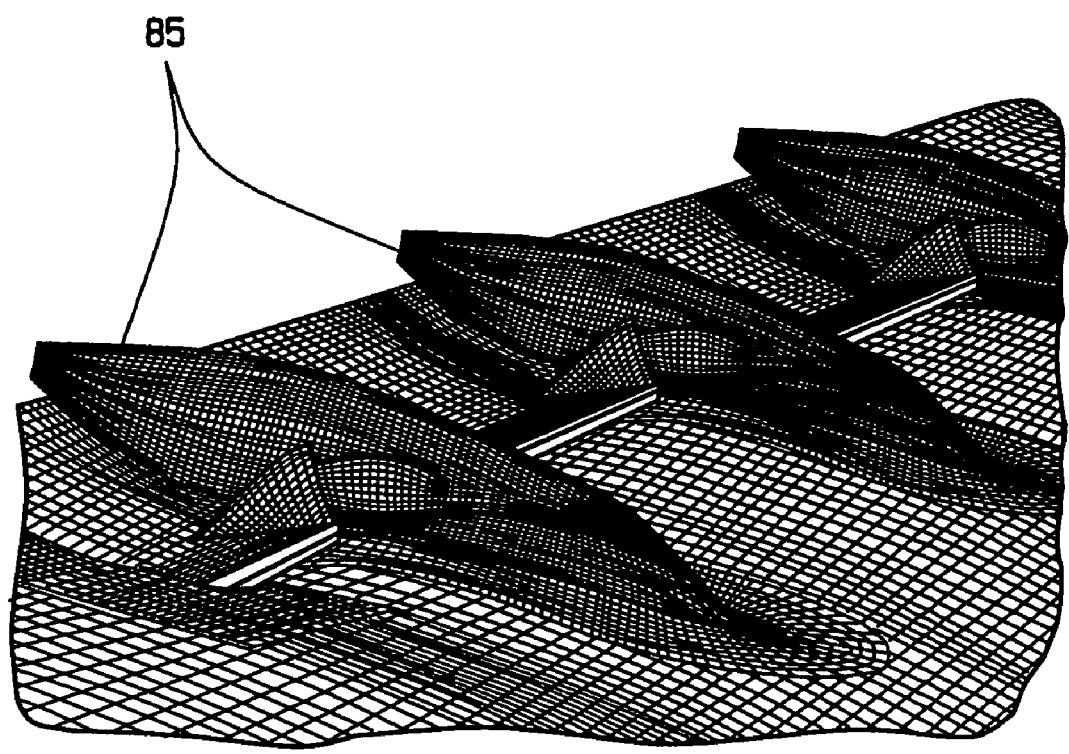
FIG. 18B is a more detailed perspective view of the flap brackets shown in FIG. 18A.

Referring now to FIGS. 18A and 18B, there is shown a finite element model of a partial-span slotted wing 82. As shown, the partial-span slotted wing 82 includes a partial-span slot 84 with flap brackets 85. In FIG. 18B, the flap brackets 85 are shown in greater detail.

Figure 19B:
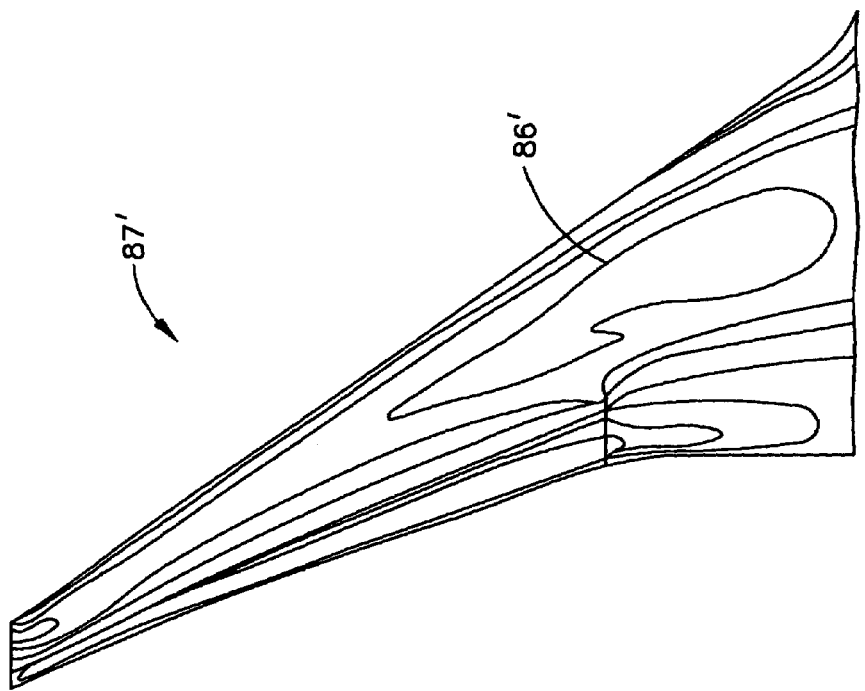
FIGS. 19A and 19B are three-dimensional CFD models representative of airflow or pressure fields over a lower wing surface of a partial-span slotted wing with and without flap brackets, respectively, in accordance with the teachings of at least one embodiment of the invention.
Figure 19A:
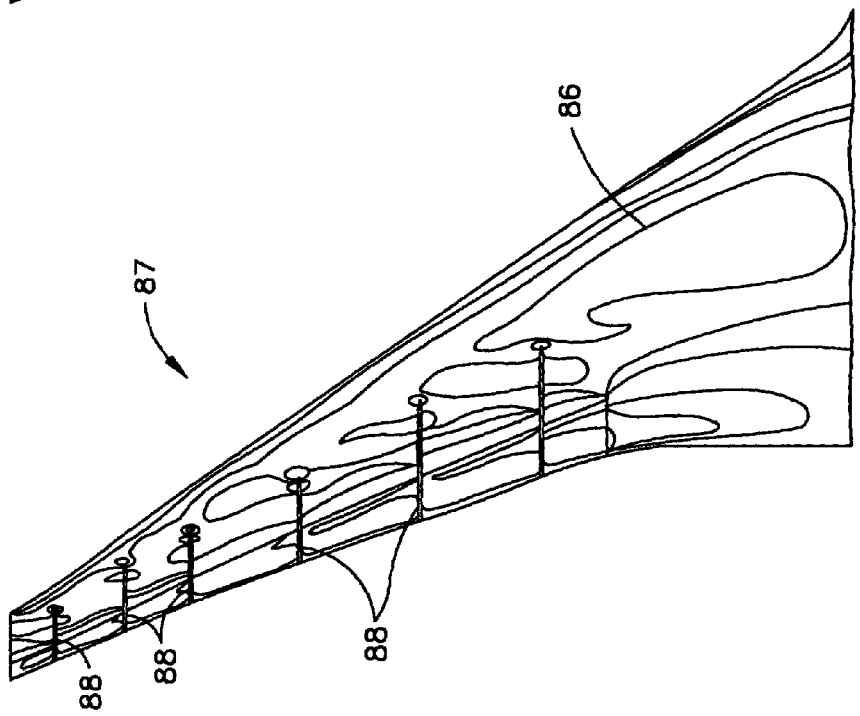

In FIG. 19A, the CFD output includes modeling representative of the airflow or pressure fields over a lower wing surface of a partial-span slotted wing 87 that includes flap brackets 88. In FIG. 19B, the CED output includes modeling representative of the airflow or pressure contours over a lower wing surface of a partial-span slotted wing 87' that does not include flap brackets. Accordingly, comparison of FIGS. 19A and 19B allows for determination of the effect that the presence and absence of flap brackets have on lower wing surface pressures.

Using the three-dimensional CFD tools and processes described herein, it was determined that the partial-span slotted wing when compared to a conventional transonic wing improved Mach ($\Delta M$) at cruise by 0.025 and improved aerodynamic efficiency ($\Delta Ml/D$) by −1.0%. It should be noted that these values (i.e., 0.025 and −1.0%) are set forth in this description for purposes of illustration only and should not be construed to limit the scope of the invention. In addition, these values were obtained by using a CFD model which included a partial-span slotted wing, a body and a vertical tail and a CFD model which included a conventional transonic wing model, a body and a vertical tail. Neither of the two CFD models included a horizontal tail, engine nacelles or struts.

The three-dimensional CFD design and analyses tools and processes and the results provided thereby were validated with transonic wind tunnel testing. More specifically, various wind tunnel tests were performed to demonstrate the delta Mach ($\Delta M$) at cruise for the partial-span slotted wing versus a conventional transonic wing design, to determine relative aerodynamic performance ($\Delta ML/D$) for the partial-span slotted wing versus a conventional transonic wing design, to determine aircraft integration effects due to nacelle integration and trim drag, and to assess the accuracy and reliability of the three-dimensional CFD analyses.

Figure 9:
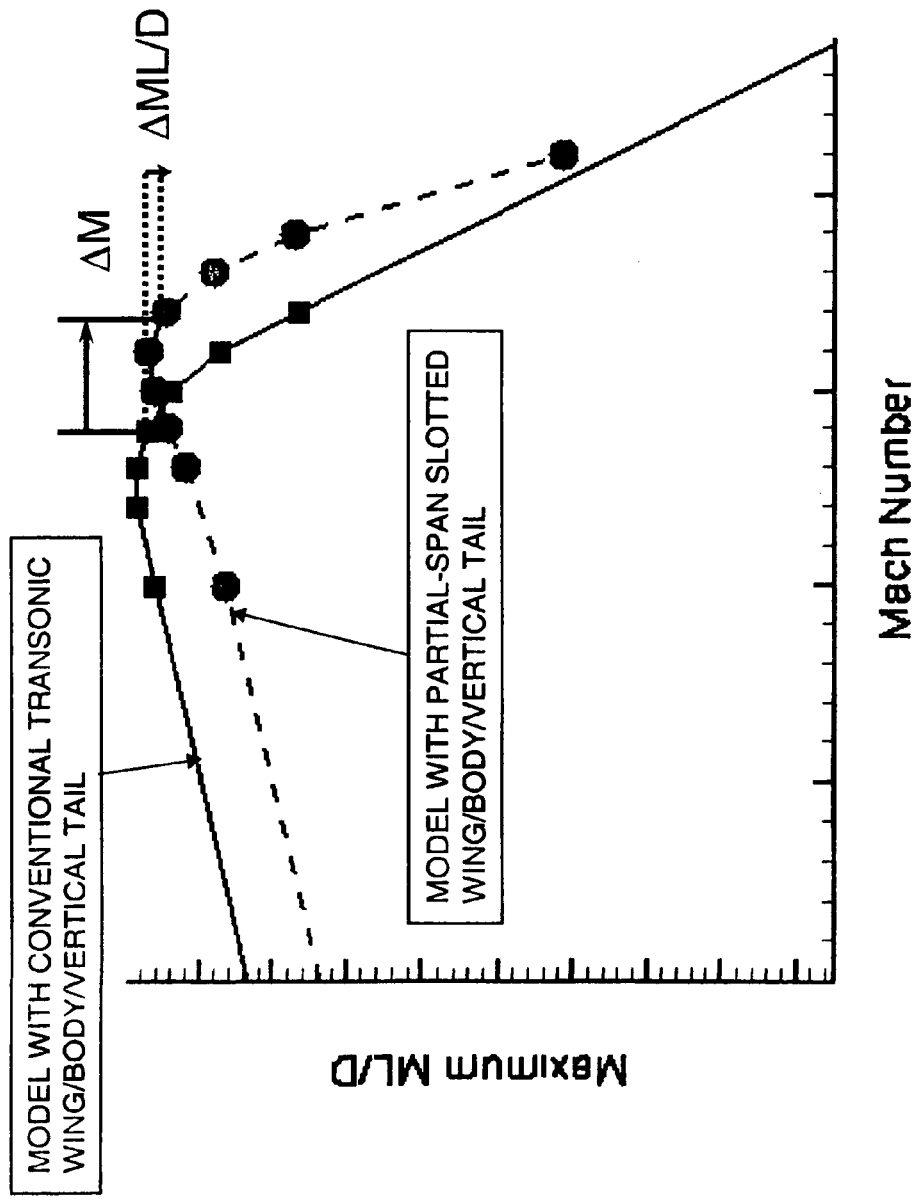
FIG. 9 is a line graph summarizing wind tunnel results for a wind tunnel test model having a partial-span slotted wing, body and vertical tail and for a wind tunnel test model having a conventional transonic wing, body, and vertical tail.
Figure 10:
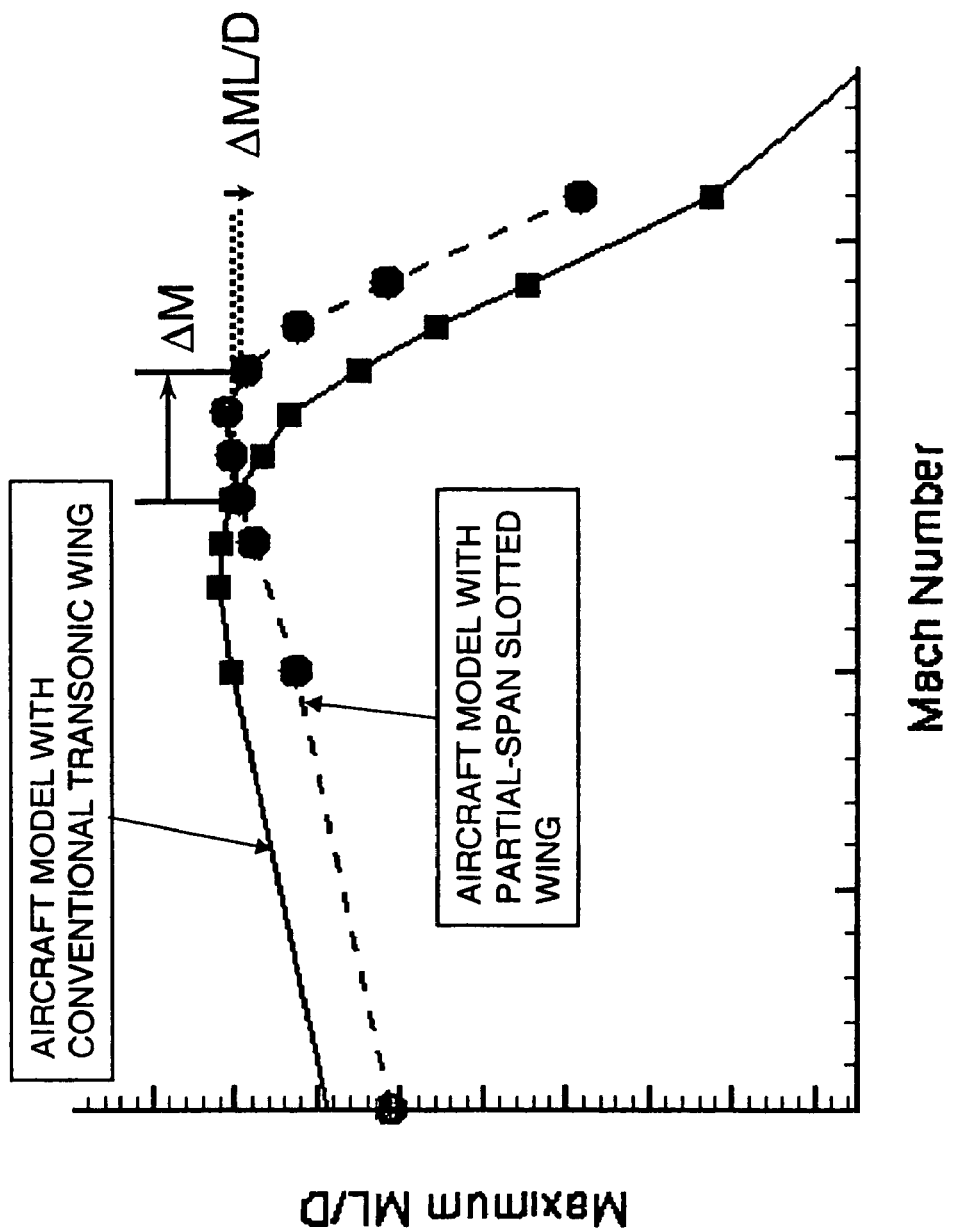
FIG. 10 is a line graph summarizing wind tunnel results for a wind tunnel test model of an aircraft equipped with a partial-span slotted wing and for a wind tunnel test model of an aircraft equipped with a conventional transonic wing.

FIGS. 9 and 10 summarize certain wind tunnel test results. To create FIG. 9, the wind tunnel test models included wings (either a partial-span slotted wing or a conventional transonic wing), a body, and a vertical tail but not a horizontal tail, engine nacelles or struts. To create FIG. 10, however, the wind tunnel test models were full-up configurations that included wings (either a partial-span slotted wing or a conventional transonic wing), a body, vertical and horizontal tails, engine nacelles, and struts.

The wind tunnel testing and the computational fluid dynamics studies were focused or directed towards aerodynamic performance. To ensure that the improvements in aerodynamic performance would be directly transferable, restrictions and constraints on the wing design were put in place which ensured that the aerodynamic improvements did not come at the expense of a degradation in performance in other disciplines or areas. For example, the modifications bringing about the aerodynamic performance improvement would not come at the expense of structural weight increases. Under these constraints, the partial-span slotted wing increased the cruise speed by a significant amount while providing acceptable high-lift and handling characteristics and at least maintaining a comparable aerodynamic efficiency (ML/D) and range to that of a conventional transonic wing design at its cruise design speed. It is anticipated that the level of improvement provided by embodiments of the invention can be increased when the aforementioned constraints that were placed on the initial design are removed. Partial-span slotted wings will likely allow for even greater improvement in aircraft efficiency when a formal inter-disciplinary trade study is performed.

Regarding performance improvements to the wing's operating conditions during transonic conditions, embodiments of the invention allow for any one of or a combination of the following to be achieved: an increase in the cruise speed or critical Mach number for the wing, an increase in lift for the wing, an increase in thickness for the wing, and/or maintenance of Mach number capability at a lower wing sweep angle. A more detailed description of the physical factors limiting the performance of transonic cruise airfoils and an explanation of how a designer can trade the technology improvement in technology level for improvements in wing thickness, speed, lift, or drag, or a combination thereof is provided below.

The slot can be used to increase drag-divergence Mach number ($M_{dd}$) capability of a wing of given sweep, lift coefficient, and thickness distribution while improving, or at least maintaining a comparable, aerodynamic efficiency (ML/D) and range for the wing during cruising flight. Aerodynamic efficiency, which is calculated by multiplying the Mach number by lift and dividing by drag (ML/D), is a non-dimensional performance measure that is of particular importance to long rang aircraft. A wing having at least one slot to improve cruise performance can be flown at a higher cruise speed before the transonic drag rise begins.

The ability of the slot to prevent, or at least delay, boundary-layer or airflow separation allows the airfoil(s) used for the wing to be designed to produce a pressure distribution in the transonic regime, with the upper-surface suction level reduced (i.e., a less-negative pressure coefficient on the upper surface) and the shock and subsequent pressure recovery moved aft, compared to a conventional airfoil. The pressure distribution that is made possible by the presence of the slot provides a higher drag-divergence Mach number ($M_{dd}$) that cannot be realized with an un-slotted conventional airfoil because of the boundary-layer separation that would occur during transonic conditions.

Aspects of the invention also allow for the use of a conventional or un-slotted wing region at the portions of a wing where the Mach number will not become critical, if any. For example, if it has been determined that the inboard portion of a wing will not become Mach number critical during cruise, the skin friction drag penalty associated with the slot can be avoided or mitigated by using an un-slotted wing region for the inboard portion. In addition, the use of the conventional or un-slotted wing region for the inboard portion of the wing allows for the use of a conventional high-lift system (e.g., conventional flaps and slats) to be used inboard as well.

Even though fuel consumption may essentially remain the same for an aircraft provided with a slotted wing, the increased cruising speeds or Mach capabilities of the aircraft does provide other efficiencies. For example, airlines can reduce trip times by cruising or flying at the increased airspeeds allowed by the slotted wing before the transonic drag rise sets in. Besides being a most certain benefit to the airlines' passengers, the quicker flights will also benefit the airlines by way of operating cost reductions. For example, shorter durational flights require less flight crew time and thus less employee pay for the flight crew. In addition, because required overhaul maintenance is usually based on the number of flight hours an aircraft has, quicker flights will also make overhaul maintenances less frequent and thus less costly.

U.S. Pat. No. 6,293,497 describes the physical factors limiting the performance of transonic cruise airfoils and the tradeoffs involved in maximizing the performance of transonic cruise airfoils. The performance of an airfoil in transonic cruise applications can be characterized by the following four basic measures:

1) The airfoil thickness, usually expressed as the maximum-thickness ratio (maximum thickness divided by chord length). Thickness is beneficial because it provides the room needed for fuel and mechanical systems and because a wing structure with greater depth can be lighter for the same strength.
2) The speed or Mach number at the preferred operating condition. The Mach number capability of the airfoil, modified by a factor related to the sweep angle of the wing, contributes directly to the cruise speed of the airplane.
3) The lift coefficient at the preferred operating condition. Increased lift coefficient is advantageous because it could allow increased weight (e.g., more fuel for longer range) or a higher cruise altitude.
4) The drag coefficient at the preferred operating condition and at other operating conditions that would be encountered in the mission of an airplane. Reducing the drag reduces fuel consumption and increases range.

Other measures such as the pitching-moment characteristics and the lift capability at low Mach numbers are also significant, but are less important than the basic four.

Together, the four basic performance measures define a level of performance that is often referred to as the "technology level" of an airfoil. The four basic performance measures impose conflicting requirements on the designer in the sense that design changes intended to improve one of the measures tend to penalize at least one of the other three. A good or optimal design for a given application therefore requires finding a favorable compromise between the four measures, evaluated in terms of the overall performance of the aircraft on which the airfoil is used. It should be noted that the compromises involved in designing airfoils for higher technology levels as determined by the above four measures may not always provide the best or optimal technology level for the aircraft overall because a higher technology level can incur penalties in terms of maximum lift, handling qualities, or smaller margin to buffet.

Sometimes a more restricted assessment of technology level is made based on only the first three of the above measures. In this restricted sense the technology level of an airfoil can be determined from where the targeted cruise operating condition lies in a three-dimensional space, which is defined by maximum-thickness ratio ($t_{max}/c$), lift coefficient ($C_l$), and Mach number (M). To reduce a position in three dimensions to a single "level", an additional assumption or rule is needed for which the following equation can be used:

$$\Delta M = [-1(\Delta t_{max}/c)] + [-\tfrac{1}{7}(\Delta C_l)]$$

The above equation is based on assumptions about what constitutes an equal level of technology and provides a means for relating the operating conditions of any two airfoils having the same technology level. The constants $-1$ and $-\tfrac{1}{7}$ are based on historical data (i.e., on comparisons of airfoils considered to be comparable in technology level). It should be noted, however, that the constants $-1$ and $-\tfrac{1}{7}$ are exemplary only and that other suitable constants can also be employed in the above equation.

To compare the technology levels of two airfoils, an exemplary procedure uses the above equation to adjust both airfoils to a common point in tmax/c and Cl and then compares the resulting Mach numbers. The difference in technology level of the two airfoils can thus be expressed as a difference in Mach.

Another exemplary way of comparing the technology levels of airfoils is to plot the drag-rise curves (drag coefficient versus Mach number at constant lift coefficient). Such curves can be used to show that the low-drag operating range of the slotted airfoil (shown just below the pressure-distribution plot in FIG. 16B) extends to a higher Mach number than the single-element airfoil (shown just below the pressure-distribution plot in FIG. 16A), with slightly higher lift and the same thickness. Of course the slotted airfoil could be redesigned to use this technology advantage for purposes other than higher speed, for example, to achieve even higher lift at the same speed as the single-element airfoil.

At any given technology level, it is generally possible to design a wide range of individual airfoils tailored to different preferred operating conditions and representing different trade-offs between the four basic performance measures. For example, one airfoil could have a higher operating Mach number than another, but at the expense of lower lift and higher drag. Given modern computational fluid dynamics tools, designing different airfoils at a given technology level is generally a straightforward task for a competent designer. On the other hand, improving the technology level, say by improving one of the basic performance measures without penalizing any of the other three, tends to be more difficult, and the more advanced the technology level one starts with, the more difficult the task becomes. Starting with an airfoil that is at a technology level representative of the current state of the art, it can be extremely difficult to find significant improvements.

Figure 16A:
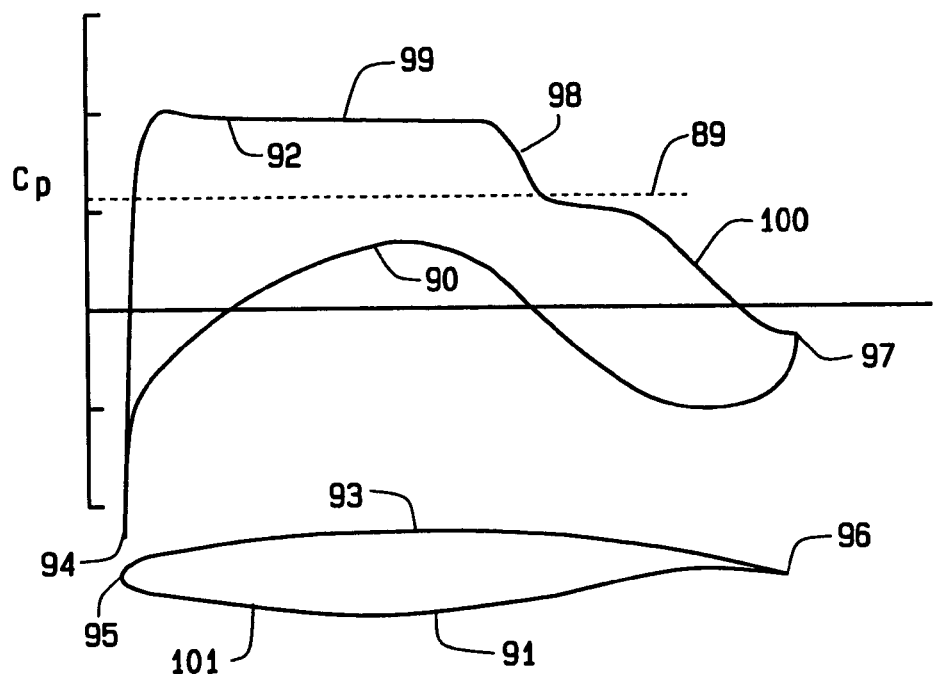
FIG. 16A illustrates a pressure distribution for a conventional un-slotted airfoil.

The main factors that limit performance are associated with the physics of the flow over the upper surface of the airfoil. To understand these factors, it helps to look at a typical transonic cruise airfoil pressure distribution, plotted in terms of the pressure coefficient (Cp) on a negative scale, as shown in FIG. 16A (extracted from U.S. Pat. No. 6,293, 497). For reference, the shape of the airfoil 101 is shown just below the pressure-distribution plot. On the Cp scale shown, Cp=0 is the static pressure of the freestream flow far from the airfoil, which is assumed to be at a subsonic speed. At each point on the surface, the value of Cp, in addition to defining the pressure, corresponds to a particular value of the flow velocity just outside the thin viscous boundary layer on the surface. Negative Cp (above the horizontal axis) represents lower pressure and higher velocity than the freestream while positive Cp (below the horizontal axis) corresponds to higher pressure and lower velocity. A particular level of negative Cp corresponds to sonic velocity and is shown by the dotted line 89.

The lower curve 90 on the pressure-distribution plot represents the pressure on the lower surface 91, or high-pressure side, and the upper curve 92 represents pressure on the upper surface 93. The vertical distance between the two curves indicates the pressure difference between the upper and lower surfaces 93 and 91, and the area between the two curves is proportional to the total lift generated by the airfoil. Note that near the leading edge there is a highly positive spike in the Cp distribution 94 at what is called the "stagnation point" 95, where the oncoming flow first "attaches" to the airfoil surface, and the flow velocity outside the boundary layer is zero. Also, note that the upper and lower surface Cp distributions come together at the trailing edge 96, defining a single value of Cp 97 that is almost always slightly positive. This level of Cp at the trailing edge has an important impact on the flow physics. Because the trailing edge Cp is dictated primarily by the overall airfoil thickness distribution, and the thickness is generally constrained by a number of structural and aerodynamic factors, trailing edge Cp is something over which the designer has relatively little control. Away from the leading edge stagnation point and the trailing edge, the designer, by varying the airfoil shape, has much more control over the pressure distribution.

For a given airfoil thickness and Mach number, the problem of achieving a high technology level boils down to the problem of maximizing the lift consistent with a low drag level. Increasing the lift solely by increasing the lower surface pressure is generally not possible without reducing airfoil thickness. Thus the designer's task is to reduce the upper surface pressure so as to produce as much lift as possible, but to do so without causing a large increase in drag. In this regard, the pressure distribution shown in FIG. 16A is typical of advanced design practice. The operating condition shown is close to the preferred operating condition that might be used for the early cruise portion of an airplane mission. The drag at this condition is reasonably low, but at higher Mach numbers and/or lift coefficients, the drag would increase rapidly.

Note that the upper surface Cp 92 over the front half of the airfoil 101 is above the dotted line 89, indicating that the flow there is mildly supersonic. Just aft of midchord, this supersonic zone is terminated by a weak shock, indicated on the surface as a sudden increase in Cp 98 to a value characteristic of subsonic flow. The Cp distribution in the supersonic zone 99 is deliberately made almost flat, with only an extremely gradual pressure rise, in order to keep the shock from becoming stronger and causing increased drag at other operating conditions. The shock is followed by a gradual pressure increase 100, referred to as a "pressure recovery", to a slightly positive Cp 97 at the trailing edge. The location of the shock and the pressure distribution in the recovery region are carefully tailored to strike a balance between increased lift and increased drag.

Trying to increase the lift will tend to move the airfoil away from this favorable balance and increase the drag. For example, one way of adding lift would be to move the shock 98 aft. This, however, would require a steeper recovery (because the immediate post shock Cp and the trailing edge Cp are both essentially fixed), which would cause the viscous boundary layer to grow thicker or even to separate from the surface, either of which would result in a significant drag increase. The other way to increase lift would be to lower the pressure ahead of the shock even further (move the Cp curve 99 upward over the forward part of the airfoil and increase the supersonic flow velocity there), but this would increase the pressure jump across the shock, which would result in an increase in the so-called shock drag. For single-element transonic airfoils at the current state of the art, this compromise between lift and drag has reached a high level of refinement such that it is unlikely that any large improvement in technology level remains to be made.

Figure 16B:
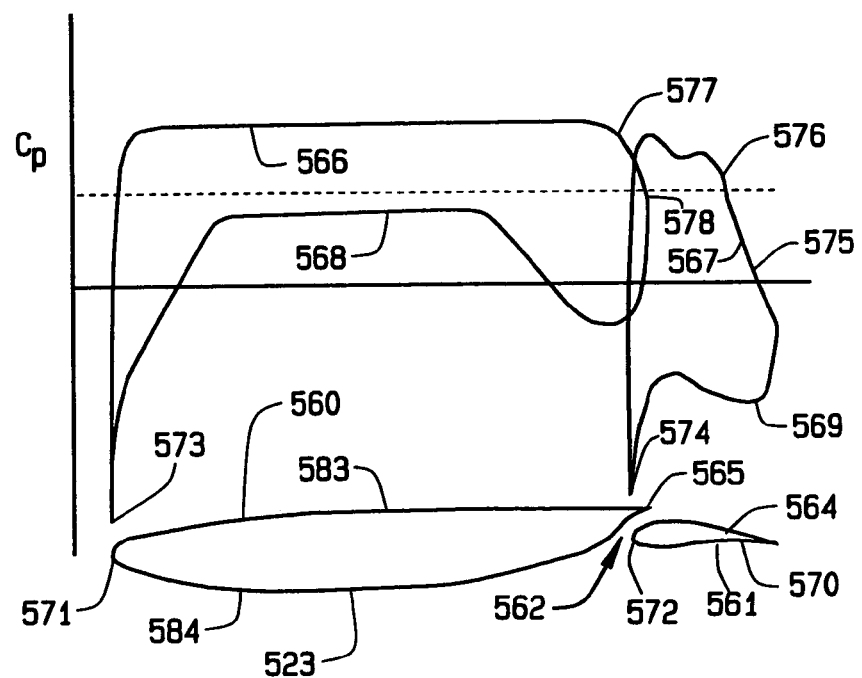
FIG. 16B illustrates a pressure distribution for a slotted airfoil.

The shape and resulting pressure distribution of a slotted transonic cruise airfoil 523 is shown in FIG. 16B (extracted from U.S. Pat. No. 6,293,497). The airfoil 523 consists of two elements (a forward element 560 and an aft element 561) separated by a curved channel (562, the slot) through which air generally flows from the lower surface 584 to the upper surface 564. In this example, the slot lip (565, the trailing edge of the forward element) is just aft of 80 percent of the overall chord from the leading edge, and the overlap of the elements is about 3 percent of the overall chord. Pressure distributions are shown for both elements, so that the pressure distributions overlap where the airfoil elements overlap. As with the conventional airfoil, the upper curves 566, 567 give the Cp distributions on the upper surfaces 564, 583, and the lower curves 568, 569 give CP on the lower surfaces 584, 570. Note that there are two stagnation points 571, 572 and their corresponding high-pressure spikes 573, 574, one on each element, where the oncoming flow attaches to the surface near each of the leading edges.

To begin the consideration of the flow physics, note that the preferred operating condition for the slotted airfoil 523 (shown just below the pressure-distribution plot in FIG. 16B) is faster than that of the single-element airfoil 101 (shown just below the pressure-distribution plot in FIG. 16A), and that the lift coefficient is slightly higher, while both airfoils have the same effective thickness for structural purposes. At the slotted airfoil's operating condition, any single-element airfoil of the same thickness would have extremely high drag. The slotted airfoil's substantial advantage in technology level results from the fact that the final pressure recovery 575 is extremely far aft, beginning with a weak shock 576 at about 90 percent of the overall chord. Such a pressure distribution would be impossible on a single-element airfoil because boundary-layer separation would surely occur, preventing the shock from moving that far aft. The mechanism, loosely termed the "slot effect", by which the slot prevents boundary-layer separation, combines several contributing factors:

1) The boundary layer on the upper surface 583 of the forward element 560 is subjected to a weak shock 577 at the slot lip 565, but there is no post-shock pressure recovery on the forward element. This is possible because the aft element 561 induces an elevated "dumping velocity" at the trailing edge of the forward element (The trailing-edge CP 578 on the forward element is strongly negative, where on a single-element airfoil the trailing-edge CP is generally positive).
2) The upper- and lower-surface boundary layers on the forward element 560 combine at the trailing edge 565 to form a wake that flows above the upper surface 564 of the aft element and that remains effectively distinct from the boundary layer that forms on the upper surface of the aft element. Over the aft part of the aft element 561, this wake is subjected to a strong pressure rise 575, 576, but vigorous turbulent mixing makes the wake very resistant to flow reversal.
3) The boundary layer on the upper surface 564 of the aft element 561 has only a short distance over which to grow, starting at the stagnation point 572 near the leading edge of the aft element, so it is very thin when it encounters the final weak shock 576 and pressure recovery 575, and is able to remain attached. With regard to its pressure distribution and boundary-layer development, the aft element 561 is, in effect, a separate airfoil in its own right, with a weak shock and pressure recovery beginning at about the mid-point of its own chord, for which we would expect attached flow to be possible.

The upper-surface pressure distribution of FIG. 16B is a relatively extreme example of what the slot effect makes possible. A range of less-extreme pressure distributions intermediate between that shown in FIG. 16B and the single-element pressure distribution of FIG. 16A can also take advantage of the slot effect. The shock on the forward element 560 does not have to be all the way back at the slot lip 565, and there does not have to be a supersonic zone on the upper surface 564 of the aft element 561. In fact, the airfoil of FIG. 16B displays a sequence of such intermediate pressure distributions when operating at lower Mach numbers and lift coefficients than the condition shown. The slot effect is still needed to prevent flow separation at these other conditions.

The pressure distribution on the lower surface contributes to the technology level of the slotted airfoil 523 of FIG. 16B. Compare the pressure distribution 568 on the lower surface 584 of the forward element 560 of the slotted airfoil 523 with the corresponding pressure distribution 90 on the lower surface 91 of the single-element airfoil 101 of FIG. 16A. The flatter pressure distribution on the slotted airfoil 523 results in less curvature of the lower surface of the airfoil 523 and greater depth of the airfoil 523 at the locations where the front and rear spars of the main structural box would be placed (typically about 15 percent and 64 percent of the overall chord). Flatter lower-surface skins and deeper spars are both favorable to the structural effectiveness of the main box structure. This advantage can be traded to improve Mach number and lift coefficient, while keeping the structural effectiveness (bending strength) of the wing box the same as that of a single-element airfoil.

Figure 20:
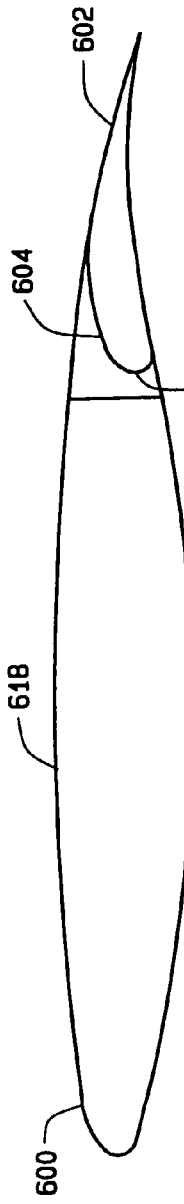
FIG. 20 is a side elevation view of an airfoil having a single-slotted trailing edge flap shown retracted.

FIG. 20 illustrates a side elevation view of a conventional airfoil 600 designed for cruise at high subsonic and/or transonic speeds. The airfoil 600 includes a single-slotted trailing edge flap 602. In FIG. 20, the flap 602 is shown in a retracted position 604, which might be used, for example, during cruise. In the retracted position 604, the nose 606 of the flap 602 nests and is hidden within the contours of the airfoil 600. In this manner, the airfoil 600 is provided with a faired and aerodynamically smooth external surface that includes at most only small steps or gaps.

It should be noted that the contours of the airfoil 600 and flap 602 are for illustrative purposes only. It should also be noted that is not uncommon for conventional cruise airfoils to include leading-edge high-lift devices, although such devices are not shown in FIGS. 20 through 22.

Figure 21:
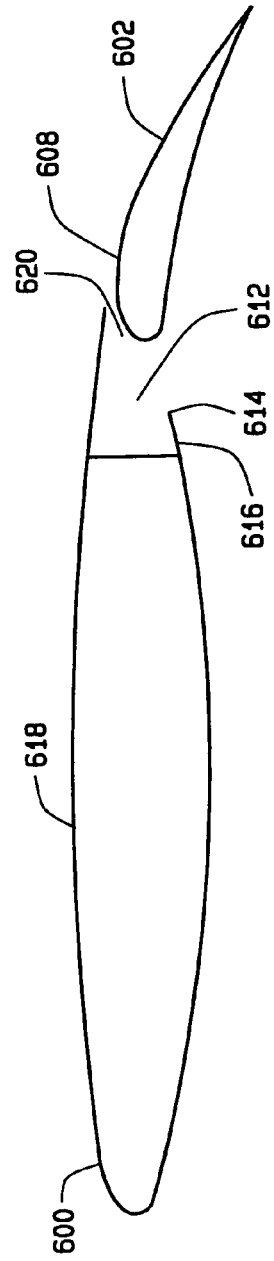
FIG. 21 is a side elevation view of the airfoil shown in FIG. 20 but with the single-slotted trailing edge flap partially deployed.
Figure 22:
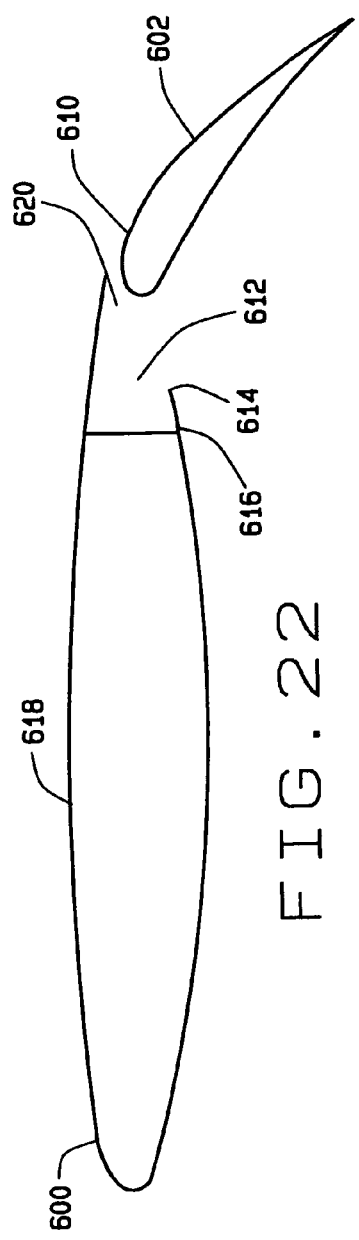
FIG. 22 is a side elevation view of the airfoil shown in FIG. 20 but with single-slotted trailing edge flap deployed at a larger deflection angle than that shown in FIG. 21.

In FIG. 21, the flap 602 is shown in a deployed position 608, which might be used, for example, during takeoff. FIG. 22 shows the flap 602 in another deployed position 610 but at a larger deflection angle than that which is shown in FIG. 21. The deployed position 610 shown in FIG. 22 might be used, for example, during landing.

To deploy the flap 602 from the retracted position 604 (FIG. 20) into either of the deployed positions 608 (FIG. 21) or 610 (FIG. 22), the flap 602 is moved aft. Moving the flap 602 aft to deploy the flap 602 opens up an cavity 612, commonly referred to as a "cove". As shown in FIGS. 21 and 22, the cavity 612 is unfaired and includes an abrupt lower edge 614 in the aft end 616 of the main or forward airfoil element 618.

On a conventional trailing-edge flap system having more than one slot (e.g., double-slotted trailing edge flaps, etc.), it is typical for more than one unfaired cove to be opened when the flap system is deployed.

Because the presence of an unfaired cove does not significantly penalize high-lift performance, there has been little incentive to configure high-lift slots in a more aerodynamically elegant way. At cruise, however, it has been observed that the presence of an unfaired cove ahead of a slot can cause significant, and sometimes unacceptable, drag penalties. Given the shapes of conventional high-lift flaps and the flap-cove regions defined by flap deployment, high-lift slots are usually closed during cruising flight to avoid incurring drag penalties arising from the flap-coves.

As shown in FIGS. 6, 16B, and 17, embodiments of the present invention include airfoils having one or more slots defined with smoothly-faired contours and without an unfaired cove. These slots include a well-faired, aerodynamically designed smooth channel. Eliminating the unfaired cove and defining the slot as a well-faired, aerodynamically smooth channel allows the slot to be open during cruise and other transonic conditions so as to achieve a performance improvement in the cruise or other transonic condition.

In addition to providing an airfoil with a cruise slot as just described, the overall shape or contour of an airfoil can also be designed specifically to take advantage of the slot effect (the slot effect is described above). A comparison of FIGS. 16A and 16B shows exemplary differences between the airfoil shapes of a slotted airfoil 523 and a conventional un-slotted airfoil 101. For example, the upper surface 583 of the slotted airfoil 523 is generally flatter than the upper surface 93 of the conventional airfoil 101, although there are also additional subtle differences between the airfoil shapes.

Deploying a cruise flap (a flap defining at least one cruise slot) requires less aft movement of the flap than the aft movement required to deploy a conventional single-slotted high-lift flap. For example, and as shown in FIGS. 20 through 22, substantial aft movement of the conventional single-slotted high-lift flap 602 is required in order to open up the cove 612 sufficiently so as not to impede airflow through the slot 620. On the other hand, embodiments of the invention include a cruise slot which remains substantially open even when the cruise flap defining the cruise slot is in its fully retracted position, although the overlap between the cruise flap and the main airfoil element is preferably short. Because substantial aft motion of the cruise flap between its cruise and high-lift positions would tend to open the cruise slot excessively and impair high-lift performance, aft motion of the cruise flap during deployment between its cruise and high-lift positions is preferably minimized in at least some embodiments of the invention.

A trailing-edge high-lift system can be integrated with a slotted airfoil in a variety of ways.

For those portions along the wingspan which do not define a cruise slot, the trailing edge high-lift system will not have to accommodate a cruise slot. Accordingly, any of a wide range of conventional high-lift flap options can be employed for these wing portions which do not include a cruise slot.

Along the portions of the wingspan that include one or more cruise slots, a variety of options can be employed. For example, at least one embodiment includes a flap defining at least one cruise slot and which is also used as single-slotted high-lift flap through an increase in deflection angle. Whether defining the cruise slot or being used as a single-slotted high-lift flap, the same wing and flap contours remain exposed to the airflow but at different flap deflection angles.

Some embodiments include an airfoil having at least one cruise slot and at least one conventional high-lift slot, preferably positioned upstream of the cruise slot. In these embodiments, the cruise slot can also serve as high-lift slot.

In preferred embodiments of a partial-span slotted wing, a cruise slot is defined along only an outboard portion of the wing, such as the portion extending spanwise between the planform break and the wing tip. In addition to the cruise slot, the outboard portion can also include a trailing-edge high-lift system. The cruise slot can function as the only high-lift slot for the outboard portion of the wing, or the cruise slot can function as a high-lift slot with one or more other conventional high-lift slots which are defined by the outboard portion of the wing.

In at least one preferred embodiment of a partial-span slotted wing, a cruise slot is not defined by an inboard portion, such as the portion extending spanwise between the wing root and the planform break. Instead, the inboard portion includes a conventional trailing-edge high-lift system the deployment of which opens one or more high-lift slots and one or more unfaired coves upstream of the high-lift slots. During cruising flight, however, the trailing-edge high-lift system is preferably retracted to close the high-lift slots and eliminate the coves that are not streamlined.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What the claimed is:

1. A swept slotted three-dimensional airfoil having a span and a predetermined three-dimensional shape tailored to improve transonic performance over an un-slotted airfoil, the airfoil comprising:
    at least one leading airfoil element having an upper surface and a lower surface;
    at least one trailing airfoil element defining a full-span transonic cruise slot with the leading airfoil element, the trailing airfoil element having an upper surface and a lower surface, the slot being positioned spanwise along the span at a position where the airfoil experiences Mach critical flow and having a predetermined three-dimensional shape to allow a portion of the air flowing along the lower surface of the leading airfoil element to diverge to flow over the upper surface of the trailing airfoil element and, thereby, to provide the performance improvement, wherein the slot location substantially coincides with a shock location.

2. A swept aircraft wing comprising the airfoil of claim 1.

3. The wing of claim 2, wherein the slot includes an aerodynamically smooth channel defined between the leading and trailing airfoil elements without an unfaired cove.

4. The wing of claim 2, wherein the slot is configured to improve performance of the wing by at least one criterion selected from:
   an increase in cruise speed;
   an increase in lift;
   an increase in thickness;
   a reduction in sweep;
   a reduction in drag; or
   a combination thereof.

5. The wing of claim 2, wherein the slot extends spanwise along the wing where airflow separation would occur to add drag during a transonic condition of the wing.

6. The wing of claim 2, wherein the slot is configured to push shock waves generated by supersonic flow across the wing to a position further aft on the wing.

7. The wing of claim 2, wherein the slot is configured to increase the drag-divergence Mach number capability of the wing while at least maintaining a comparable aerodynamic efficiency for the wing.

8. The wing of claim 2, wherein the slot is configured to mitigate shock waves and provide a higher cruise speed for the wing.

9. The wing of claim 2, further comprising an actuator structure coupled to the leading and trailing airfoil elements for moving one of the leading and trailing airfoil elements relative to the other element to trim the slot.

10. The wing of claim 9, wherein the actuator structure is configured to trim the slot by at least one action selected from:
   adjusting a gap separating the leading and trailing airfoil elements, the gap defining the slot;
   adjusting a relative height between the leading and trailing airfoil elements;
   adjusting an angle between the leading and trailing airfoil elements; or a combination thereof.

11. A swept aircraft wing comprising a swept slotted three-dimensional airfoil having a span and a predetermined three-dimensional shape tailored to improve transonic performance over an un-slotted airfoil, the airfoil comprising:
   at least one leading airfoil element having an upper surface and a lower surface;
   at least one trailing airfoil element defining a full-span transonic cruise slot with the leading airfoil element, the trailing airfoil element having an upper surface and a lower surface, the slot being positioned spanwise along the span at a position where the airfoil experiences Mach critical flow and having a predetermined three-dimensional shape to allow a portion of the air flowing along the lower surface of the leading airfoil element to diverge to flow over the upper surface of the trailing airfoil element and, thereby, to provide the performance improvement, and
   an actuator structure coupled to the leading and trailing airfoil elements for moving at least one of the leading and trailing airfoil elements relative to the other element,
   wherein the slot includes a plurality of segments longitudinally arranged along the wing, each of the segments being independently adjustable by the actuator structure to allow trimming of the slot differently at different locations along the span.

12. The wing of claim 2, further comprising an actuator structure coupled to the leading and trailing airfoil elements for moving one of the leading and trailing airfoil elements relative to the other element to close the slot during at least one subsonic condition and to open the slot during the transonic condition.

13. The wing of claim 2, wherein the slot is defined during at least one transonic condition of the wing selected from at least one of a cruise condition and a maneuver.

14. The wing of claim 2, wherein:
   the leading airfoil element comprises a main wing portion;
   the trailing airfoil element comprises a flap; and
   the wing further comprises an actuator structure for trimming the flap during cruise to improve performance of the wing during cruise.

15. An aircraft comprising the airfoil of claim 1.

16. A method for flying a slotted aircraft wing having a predetermined three-dimensional shape tailored to improve transonic performance over an un-slotted wing, a span, at least one leading airfoil element, and at least one trailing airfoil element defining at least one full-span transonic cruise slot with the leading airfoil element, the slot being positioned along the span at a position where the wing experiences Mach critical flow and such that the slot location substantially coincides with a shock location, the slot having a predetermined three-dimensional shape to allow a portion of the air flowing along a lower surface of the leading airfoil element to diverge to flow over the upper surface of the trailing airfoil element and, thereby, to provide the performance improvement, the method comprising trimming the slot during a transonic condition so as to achieve a performance improvement in the transonic condition.

17. The method of claim 16, wherein the transonic condition is selected from at least one of a cruise condition and a maneuver.

18. The method of claim 16, wherein:
   the leading airfoil element comprises a main wing portion;
   the trailing airfoil element comprises a flap assembly; and
   trimming the slot comprises actuating the flap assembly.

19. The method of claim 16, wherein trimming the slot comprises at least one action selected from:
   adjusting a gap separating the leading and trailing airfoil elements, the gap defining the slot;
   adjusting a relative height between the leading and trailing airfoil elements;
   adjusting an angle between the leading and trailing airfoil elements; or
   a combination thereof.

20. The method of claim 16, further comprising closing the slot during at least one subsonic condition of the wing.

21. The method of claim 16, wherein the slot includes an aerodynamically smooth channel defined between the leading and trailing airfoil elements without an unfaired cove.

22. A method for flying a swept slotted aircraft wing defining at least one full-span transonic cruise slot positioned along the span at a position where the wing experiences Mach critical flow and such that the slot location substantially coincides with a shock location, the slot having a predetermined three-dimensional shape tailored to improve transonic performance over an un-slotted wing, the method comprising using the full-span slot to divert a portion of the air flowing along a lower surface of the wing to flow over an upper surface of the wing during at least one transonic condition of the wing, the diverting at least delaying airflow separation that would occur to add drag at the transonic condition so as to achieve a performance improvement in the transonic condition.

23. The method of claim 22, further comprising trimming the slot during the transonic condition.

24. The method of claim 23, wherein trimming the slot comprises at least one action selected from:

adjusting a gap separating a leading element and a trailing element, the gap defining the slot;

adjusting a relative height between the leading element and the trailing element;

adjusting an angle between the leading element and the trailing element; or a combination thereof.

25. The method of claim 24, wherein:

the leading airfoil element comprises a main wing portion;

the trailing airfoil element comprises a flap assembly; and trimming the slot comprises actuating the flap assembly.

26. The method of claim 22, further comprising opening the slot when at or near the transonic condition.

27. The method of claim 22, further comprising closing the slot during at least one subsonic condition of the wing.

28. The method of claim 22, wherein the slot includes an aerodynamically smooth channel defined between the leading and trailing airfoil elements without an unfaired cove.

29. A method for flying a slotted aircraft wing having a predetermined three-dimensional shape tailored to improve transonic performance over an un-slotted wing, a span, a main wing portion, and a flap assembly defining at least one full-span transonic cruise slot with the main wing portion during cruise, the slot being positioned along the span at a position where the wing experiences Mach critical flow and such that the slot location substantially coincides with the shock location, the slot having a predetermined three-dimensional shape to allow a portion of the air flowing along a lower surface of the leading airfoil element to diverge to flow over the upper surface of the trailing airfoil element and, thereby, to provide the performance improvement, the method comprising actuating the flap assembly during cruise to trim the flap assembly so as to achieve a performance improvement during cruise.

30. The method of claim 29, wherein the slot includes an aerodynamically smooth channel defined between the leading and trailing airfoil elements without an unfaired cove.

31. The wing of claim 9, wherein the slot includes a plurality of segments longitudinally arranged along the wing, each said segment being independently adjustable by the actuator structure to allow trimming of the slot differently at different locations along the span.

32. The wing of claim 11, wherein the slot extends spanwise along the wing where airflow separation would occur to add drag during a transonic condition of the wing.

33. The wing of claim 11, wherein the slot is configured to push shock waves generated by supersonic flow across the wing to a position further aft on the wing.

34. The wing of claim 11, wherein the slot is configured to increase the drag-divergence Mach number capability of the wing while at least maintaining a comparable aerodynamic efficiency for the wing.

35. The wing of claim 11, wherein the slot is configured to mitigate shock waves and provide a higher cruise speed for the wing.

36. The method of claim 16, wherein the slot includes a plurality of segments longitudinally arranged along the wing, and wherein trimming the slot includes independently adjusting each said segment to trim the slot differently at different locations along the span.

37. The method of claim 23, wherein the slot includes a plurality of segments longitudinally arranged along the wing, and wherein trimming the slot includes independently adjusting each said segment to trim the slot differently at different locations along the span.

38. The method of claim 29, wherein the slot includes a plurality of segments longitudinally arranged along the wing, and wherein the method includes independently adjusting each said segment to trim the slot differently at different locations along the span.

* * * * *